US012623212B2

(12) United States Patent
Claridge

(10) Patent No.: US 12,623,212 B2

(45) Date of Patent: May 12, 2026

(54) PHYSICALLY REINFORCED STRUCTURED ORGANIC FILM (SOF) ANION EXCHANGE MEMBRANES (AEMs)

(71) Applicant: XEROX CORPORATION, Norwalk, CT (US)

(72) Inventor: Robert Claridge, Gilford (CA)

(73) Assignee: XEROX CORPORATION, Norwalk, CT (US)

( * ) Notice: Subject to any disclaimer, the term of this patent is extended or adjusted under 35 U.S.C. 154(b) by 66 days.

(21) Appl. No.: 18/229,427

(22) Filed: Aug. 2, 2023

(65) Prior Publication Data

US 2025/0041842 A1 Feb. 6, 2025

(51) Int. Cl.

| | |
|---|---|
| ***B01J 41/13*** | (2017.01) |
| ***B01J 41/05*** | (2017.01) |
| ***B01J 47/12*** | (2017.01) |
| ***C08L 71/00*** | (2006.01) |

(52) U.S. Cl.

CPC ............... *B01J 41/13* (2017.01); *B01J 41/05* (2017.01); *B01J 47/12* (2013.01); *C08L 71/00* (2013.01)

(58) Field of Classification Search

CPC .. B01J 41/13; B01J 41/05; B01J 47/12; C08L 71/00

See application file for complete search history.

(56) References Cited

U.S. PATENT DOCUMENTS

| | | |
|---|---|---|
| 5,011,956 A | 4/1991 | Ford et al. |
| 5,119,314 A | 6/1992 | Hotta et al. |
| 7,108,935 B2 | 9/2006 | Bauer et al. |
| 8,029,857 B2 | 10/2011 | Hoek et al. |

(Continued)

FOREIGN PATENT DOCUMENTS

| | | |
|---|---|---|
| CA | 2833684 A1 | 1/2013 |
| CN | 107915658 B | 4/2020 |

(Continued)

OTHER PUBLICATIONS

Lancheros et al. ("Development and Characterization of Poly(oxy-1,4-phenylenesulfonyl-1,4-phenylene) for Proton Exchange Membranes" Journal of Applied Engineering Science, 2021, 19(4), p. 1013-1019) (Year: 2021).*

(Continued)

*Primary Examiner* — Travis M Figg

(74) *Attorney, Agent, or Firm* — MH2 Technology Law Group LLP

(57) ABSTRACT

A structured organic film (SOF) composite is disclosed, including a structured organic film (SOF), which may include a plurality of segments; a plurality of linkers, where at least one of the plurality of linkers connects at least one of the plurality of segments. The composite also includes a polymer additive incorporated into the SOF. The polymer additive is present in the SOF in a plurality of nanodomains, ranging in size from about 50 nm to about 1 micron. The polymer additive may include a polysulfone. The polysulfone can be poly(oxy-1,4-phenylenesulfonyl-1,4-phenylene). The polymer additive is present in an amount of from about 5 wt % to about 25 wt % based on a total weight of the SOF composite. The structured organic film (SOF) composite may include an ionic segment or ionic capping segment.

19 Claims, 6 Drawing Sheets

(56) References Cited

U.S. PATENT DOCUMENTS

| | | | |
|---|---|---|---|
| 8,093,347 B2 | 1/2012 | Heuft et al. | |
| 8,119,315 B1 | 2/2012 | Heuft et al. | |
| 8,264,516 B2 | 9/2012 | Stevens et al. | |
| 8,313,560 B1 | 11/2012 | Cote et al. | |
| 8,318,892 B2 | 11/2012 | Côtéet al. | |
| 8,353,574 B1 | 1/2013 | Heuft et al. | |
| 8,377,999 B2 | 2/2013 | Cote et al. | |
| 8,389,060 B2 | 3/2013 | Heuft et al. | |
| 8,410,016 B2 | 4/2013 | Cote et al. | |
| 8,436,130 B2 | 5/2013 | Cote et al. | |
| 8,518,253 B2 | 8/2013 | Xiong et al. | |
| 8,529,997 B2 | 9/2013 | Heuft et al. | |
| 8,591,997 B2 | 11/2013 | Heuft et al. | |
| 8,652,043 B2 | 2/2014 | Drucker et al. | |
| 8,765,340 B2 | 7/2014 | Vella et al. | |
| 8,906,462 B2 | 12/2014 | Wigglesworth et al. | |
| 9,097,995 B2 | 8/2015 | Heuft et al. | |
| 9,309,343 B2 | 4/2016 | Van Berchum et al. | |
| 9,375,678 B2 | 6/2016 | Nair et al. | |
| 9,580,824 B2 | 2/2017 | Masel et al. | |
| 9,768,502 B2 | 9/2017 | Lin | |
| 9,815,032 B2 | 11/2017 | Hill et al. | |
| 9,950,549 B2 | 4/2018 | Kanungo et al. | |
| 10,076,728 B2 | 9/2018 | Song et al. | |
| 10,258,932 B2 | 4/2019 | Birss et al. | |
| 10,281,831 B2 | 5/2019 | Cote et al. | |
| 10,347,939 B2 | 7/2019 | Choi et al. | |
| 10,384,441 B2 | 8/2019 | Badesha et al. | |
| 10,570,524 B2 | 2/2020 | Matthews et al. | |
| 10,710,065 B2 | 7/2020 | Helms et al. | |
| 10,792,392 B2 | 10/2020 | Kourtis et al. | |
| 10,869,950 B2 | 12/2020 | Kourtis et al. | |
| 11,053,193 B2 | 7/2021 | Berghofer et al. | |
| 2007/0055045 A1 | 3/2007 | Kiefer et al. | |
| 2010/0147704 A1 | 6/2010 | Xiong et al. | |
| 2010/0224867 A1 | 9/2010 | Heuft et al. | |
| 2010/0227157 A1* | 9/2010 | Heuft | C09B 69/109 427/261 |
| 2010/0228025 A1* | 9/2010 | Cote | H10K 71/10 427/372.2 |
| 2011/0217642 A1* | 9/2011 | Heuft | G03G 5/06 977/773 |
| 2011/0281197 A1 | 11/2011 | Daikoku et al. | |
| 2012/0029236 A1* | 2/2012 | Cote | C07C 215/68 564/434 |
| 2012/0296189 A1 | 11/2012 | Bhogal et al. | |
| 2014/0054171 A1 | 2/2014 | Feldman et al. | |
| 2014/0088207 A1 | 3/2014 | Elabd et al. | |
| 2014/0099571 A1 | 4/2014 | Proietti et al. | |
| 2016/0251766 A1 | 9/2016 | Masel et al. | |
| 2016/0259256 A1* | 9/2016 | Cote | G03G 5/0764 |
| 2016/0293860 A1 | 10/2016 | Van Der Boom et al. | |
| 2017/0240473 A1 | 8/2017 | Budarin et al. | |
| 2019/0074710 A1 | 3/2019 | Hansen | |
| 2019/0168173 A1 | 6/2019 | Tsapatsis et al. | |
| 2019/0322114 A1 | 10/2019 | Sambhy et al. | |
| 2020/0388871 A1 | 12/2020 | Newbloom et al. | |
| 2021/0047242 A1 | 2/2021 | Liu et al. | |
| 2022/0127396 A1 | 4/2022 | Hartmann-Thompson et al. | |
| 2022/0223885 A1 | 7/2022 | Beh et al. | |
| 2022/0282041 A1* | 9/2022 | Swager | B01D 53/228 |
| 2023/0250207 A1* | 8/2023 | Bae | C08K 5/17 525/333.3 |
| 2024/0279376 A1 | 8/2024 | Yoshimura et al. | |

FOREIGN PATENT DOCUMENTS

| | | | | |
|---|---|---|---|---|
| EP | 3476883 A1 | 5/2019 | | |
| EP | 3440239 B1 * | 11/2020 | H01M 8/1027 | |
| WO | 2006/016068 A2 | 2/2006 | | |
| WO | 2012045152 A1 | 4/2012 | | |
| WO | 2015178912 A1 | 11/2015 | | |
| WO | 2018143913 A1 | 8/2018 | | |
| WO | 2018/193021 A1 | 10/2018 | | |
| WO | 2022/144900 A1 | 7/2022 | | |

OTHER PUBLICATIONS

Claridge et al. ("Structured Organic Films Containing N-Cyclic Quaternary Ammonium having Cationic Charge Functionality and Methods Thereof" Nov. 1, 2022 provided in IDS) (Year: 2022).*

Claridge et al. ("Structured Organic Films Containing Imidazolium having Cationic Charge Functionality and Methods Thereof" Sep. 15, 2022 provided in IDS) (Year: 2022).*

Agari et al., "Estimation of the compositional gradient in a PVC/PMMA graded blend prepared by the dissolution-diffusion method," ScienceDirect, Polymer, vol. 48, 2007 (Available online Jan. 10, 2007), pp. 1139-1147.

Aggarwal et al., "Ligand Valency Effects on the Alkaline Stability of Metallopolymer Anion-Exchange Membranes," Macromolecular Rapid Communications, vol. 42, Article 2100238, 2021 (Published online Jun. 25, 2021), 6 pages.

Alabi et al., "Electrostatically-coupled graphene oxide nanocomposite cation exchange membrane," Journal of Membrane Science, vol. 594, Article 117457, 2020 (Available online Sep. 7, 2019), pp. 1-10.

Author Unknown, "Fuel Cells—Alkaline Anion Exchange Membranes," The Department of Chemistry & Chemical Biology, Abruna Electrochemistry, date unknown, 5 pages (https://abruna.chem.cornell.edu/research/fuel-cells/).

Author Unknown, "Polymer (matrix) structure—A236," CKN Knowledge in Practice Centre, date unknown, 7 pages (https://compositeskn.org/KPC/A236—Web Page last edited Mar. 10, 2021).

Banerjee et al., "Nafion Perfluorinated Membranes in Fuel Cells," Journal of Fluorine Chemistry, vol. 125, Issue 8, Aug. 2004, pp. 1211-1216.

Cho et al., "Engineering Synergy: Energy and Mass Transport in Hybrid Nanomaterials," Advanced Materials, vol. 27, 2015 (Published online Mar. 5, 2015), pp. 5744-5752.

Chu et al., "Practical Implementation of bis-six-membered N-cyclic Quaternary Ammonium Cations in Advanced Anion Exchange Membranes for Fuel Cells: Synthesis and Durability," Journal of Membrane Science, vol. 578, 2019 (Available online Feb. 20, 2019), pp. 239-250.

Claussen et al., "Longitudinal polymer gradient materials based on crosslinked polymers," Polymer, vol. 55, 2014 (Available online Nov. 19, 2013), pp. 29-38.

Disabb-Miller et al., "Water Uptake and Ion Mobility in Cross-Linked Bis(terpyridine)ruthenium-Based Anion Exchange Membranes," Macromolecules, vol. 46, 2013 (Published Nov. 22, 2013), pp. 9279-9287.

Henkensmeier et al., "Overview: State-of-the Art Commercial Membranes for Anion Exchange Membrane Water Electrolysis," Journal of Electrochemical Energy Conversion and Storage, vol. 18, May 2021 (Published online Aug. 24, 2020), pp. 024001-1 through 024001-18.

Hollóczki et al., "Hydrolysis of Imidazole-2-ylidenes," Journal of the American Chemical Society (JACS), vol. 133, 2011 (Published Dec. 21, 2010), pp. 780-789.

Inagi, "Fabrication of Gradient Polymer Surfaces Using Bipolar Electrochemistry," Polymer Journal, vol. 48, 2016 (Published online Sep. 30, 2015), pp. 39-44.

Jaroszek et al., "Ion-exchange Membranes in Chemical Synthesis—a Review," Open Chem., vol. 14, 2015, pp. 1-19.

Kaczur et al., "A Review of the Use of Immobilized Ionic Liquids in the Electrochemical Conversion of $CO_2$," Journal of Carbon Research, vol. 6, No. 33, 2020 (Published May 24, 2020), 12 pages.

Kaczur et al., "Carbon Dioxide and Water Electrolysis Using New Alkaline Stable Anion Membranes," Frontiers in Chemistry, Technology Report, vol. 6, Article 263, Jul. 3, 2018, 16 pages.

Kandambeth et al., "Selective Molecular Sieving in Self-Standing Porous Covalent-Organic-Framework Membranes," Advanced Materials, vol. 29, Article 1603945, 2017 (Published online Nov. 7, 2016), pp. 1-9.

(56) References Cited

OTHER PUBLICATIONS

Kayser et al., "Cross-linked Sulfonated Poly(ether ether ketone) by Using Diamino-organosilicon for Proton Exchange Fuel Cells," The Journal of Physical Chemistry B, vol. 115, 2011 (Published Mar. 10, 2021), pp. 2916-2923.
Koshikawa et al., "Single Nanometer-Sized NiFe-Layered Double Hydroxides as Anode Catalyst in Anion Exchange Membrane Water Electrolysis Cell with Energy Conversion Efficiency of 74.7% at 1.0 A $cm^{-2}$," American Chemical Society, ACS Catal., vol. 10, 2020 (Published Jan. 6, 2020), pp. 1886-1893.
Kwasny et al., "Expanding metal cation options in polymeric anion exchange membranes," Journal of Materials Chemistry A, vol. 5, 2017 (Published Dec. 5, 2016), pp. 1400-1405.
Lee et al., "Poly(terphenylene) Anion Exchange Membranes: The Effect of Backbone Structure on Morphology and Membrane Property," ACS Macro Letters, vol. 6, 2017 (Published May 5, 2017), pp. 566-570.
Leech et al., "Effect of Composition of Polymer Backbone on Spectroscopic and Electrochemical Properties of Ruthenium(II) Bis(2,2'-bipyridyl)-containing 4-Vinylpyridine/Styrene Copolymers," Journal of Materials Chemistry, vol. 1, No. 4, Jan. 1991, pp. 629-635 (8 pages).
Li et al., "Recent advances in the fabrication of advanced composite membranes," Journal of Materials Chemistry A, vol. 1, 2013 (Published Jun. 21, 2013), pp. 10058-10077.
Lin et al., "Two-dimensional covalent triazine framework as an ultrathin-film nanoporous membrane for desalination," Chem. Commun., vol. 51, 2015 (Published Aug. 14, 2015), pp. 14921-14924.
Liu et al., "Functional gradients and heterogeneities in biological materials: Design principles, functions, and bioinspired applications," Progress in Materials Science, vol. 88, 2017 (Available online Apr. 25, 2017), pp. 467-498.
Lu et al., "A novel 3D covalent organic framework membrane grown on a porous a-$Al_2O_3$ substrate under solvothermal conditions," Chem. Commun., vol. 51, 2015 (Published Aug. 28, 2015), pp. 15562-15565.
Meng et al., "2D and 3D Porphyrinic Covalent Organic Frameworks: The Influence of Dimensionality on Functionality," Angewandte Chemie, vol. 132, 2020 (First Published Nov. 27, 2019), pp. 3653-3658.
Meyers et al., "Structural Biological Materials: Critical Mechanics—Materials Connections," Science, vol. 339, Feb. 15, 2013, pp. 773-779 (8 pages).
Moon et al., Sulfonated PEEK Ion Exchange Membranes for Direct Methanol Fuel Cell Applications, Macromolecular Research, vol. 15, No. 4, Jun. 2007, pp. 379-384.
Oh et al., "In vitro and in vivo characteristics of PCL scaffolds with pore size gradient fabricated by a centrifugation method," Biomaterials, vol. 28, 2007 (Available online Dec. 28, 2006), pp. 1664-1671.
Pedron et al, "Microfluidic approaches for the fabrication of gradient crosslinked networks based on poly(ethylene glycol) and hyperbranched polymers for manipulation of cell interactions," Journal of Biomedical Materials Research A, vol. 96, Issue 1, Jan. 2011 (Published online Nov. 9, 2010), pp. 196-203.
Qiu et al., "Alkaline imidazolium- and quaternary ammonium-functionalized anion exchange membranes for alkaline fuel cell applications," Journal of Materials Chemistry, vol. 22, 2012 (Published Nov. 14, 2011), pp. 1040-1045.
Ran et al., "Ion exchange membranes: New developments and applications," Journal of Membrane Science, vol. 522, 2017 (Available online Sep. 22, 2016), pp. 267-291.
Suhaimin et al., "Methanol Permeability and Properties of Polymer Electrolyte Membrane Based on Graphene Oxidesulfonated (Polyether Ether) Ketone," Malaysian Journal of Analytical Sciences, vol. 21, No. 2, Jan. 2017, pp. 435-444 (11 pages).
Teng et al., "Preparation of Compositional Gradient Polymeric Films Based on Gradient Mesh Template," Polymers, vol. 10, 2018 (Published Jun. 18, 2018), 15 pages.
Varcoe et al., "Anion-exchange membranes in electrochemical energy systems," Energy & Environmental Science, vol. 7, 2014 (Open Access Article Published Aug. 4, 2014), pp. 3135-3191.
Wang et al., "Efficient electrically powered CO2-to-ethanol via suppression of deoxygenation," Nature Energy, vol. 5, 2020 (Published online May 11, 2020), 9 pages.
Wang et al., "N-cyclic quaternary ammonium-functionalized anion exchange membrane with improved alkaline stability enabled by aryl-ether free polymer backbones for alkaline fuel cells," Journal of Membrane Science, vol. 587, Article 117135, 2019 (Available online May 31, 2019), pp. 1-10.
Wang et al., "Novel Hydroxide-Conducting Polyelectrolyte Composed of an Poly(arylene ether sulfone) Containing Pendant Quaternary Guanidinium Groups for Alkaline Fuel Cell Applications," Macromolecules, vol. 43, 2010 (Published on the Web Mar. 22, 2010), pp. 3890-3896.
Wang et al., "Stabilizing the Imidazolium Cation in Hydroxide-Exchange Membranes for Fuel Cells," ChemSusChem Communications, vol. 6, 2013 (Published online Aug. 22, 2013), pp. 2079-2082 (5 pages).
Yang et al., "Functionally graded membranes from nanoporous covalent organic frameworks for highly selective water permeation," Journal of Materials Chemistry A, vol. 6, 2018 (Published Dec. 4, 2017), pp. 583-591.
Yang et al., The Application of Cation Exchange Membranes in Electrochemical Systems for Ammonia Recovery from Wastewater, Membranes, vol. 11, 2021 (Published Jun. 30, 2021), 14 pages.
Yee et al., "The Effects of Sulfonated Poly(ether ether ketone) Ion Exchange Preparation Conditions on Membrane Properties," Membranes, vol. 3, 2013 (Published Aug. 13, 2013), pp. 182-195.
Yuan et al., "Ring-opening metathesis polymerization of cobaltocenium derivative to prepare anion exchange membrane with high ionic conductivity," Polyhedron, vol. 181, Article 114462, 2020 (Available online Mar. 2, 2020), pp. 1-7.
Zha et al., "Metal-Cation-Based Anion Exchange Membranes," Journal of the American Chemical Society (JACS), vol. 134, 2012 (Published Mar. 2, 2012), pp. 4493-4496.
Zhang et al., "Novel cross-linked anion exchange membranes with diamines as ionic exchange functional groups and crosslinking groups," International Journal of Hydrogen Energy, vol. 39, 2014 (Available online May 9, 2014), pp. 13718-13724.
Zhu et al., "Cationic Metallo-Polyelectrolytes for Robust Alkaline Anion-Exchange Membranes," Author Manuscript, Angew. Chem. Int. Ed., vol. 57, No. 9, Feb. 23, 2018 (First published Dec. 31, 2017), pp. 2388-2392 (7 pages).
Zhu et al., "Rational Synthesis of Metallo-Cations Toward Redox- and Alkaline-Stable Metallo-Polyelectrolytes," Journal of the American Chemical Society (JACS), vol. 142, 2020 (Published Dec. 17, 2019), pp. 1083-1089.
Claridge, R., et al., "Flexible Ionic Building Blocks With High Ionic Conductivity and Alkaline Stability for Use in Structured Organic Film (SOF) Containing Anion Exchange Membranes (AEMs)," U.S. Appl. No. 18/218,445, filed Jul. 5, 2023, 45 pages.
Claridge, R., et al., "Structured Organic Films Containing Imidazolium Having Cationic Charge Functionality and Methods Thereof," U.S. Appl. No. 17/946,007, filed Sep. 15, 2022, 38 pages.
Claridge, R., et al., "Structured Organic Films Containing N-Cyclic Quaternary Ammonium Having Cationic Charge Functionality and Methods Thereof," U.S. Appl. No. 18/051,800, filed Nov. 1, 2022, 42 pages.
Farrugia, V., et al., "Flexible Structured Organic Film Membrane Formulations and Methods Thereof," U.S. Appl. No. 18/218,420, filed Jul. 5, 2023, 43 pages.
Farrugia, V.M., et al., "Anion Exchange Membranes From Structured Organic Films and Methods Thereof," U.S. Appl. No. 17/946,006, filed Sep. 15, 2022, 38 pages.
Farrugia, V.M., et al., "Cation Exchange Membranes From Structured Organic Films and Methods Thereof," U.S. Appl. No. 17/946,003, filed Sep. 15, 2022, 39 pages.
Farrugia, V.M., et al., "Gradient Membranes Formed From Free Standing Structured Organic Films and Methods Thereof," U.S. Appl. No. 17/946,001, filed Sep. 15, 2022, 42 pages.

(56) References Cited

OTHER PUBLICATIONS

Marino, M.G., et al., "Alkaline Stability of Quaternary Ammonium Cations for Alkaline Fuel Cell Membranes and Ionic Liquids," ChemSusChem., vol. 8, 2015 (Published online Nov. 27, 2014), pp. 513-523.

Min, K., et al., "Crosslinked poly(m-terphenyl N-methyl piperidinium)-SEBS membranes with aryl-ether free and kinked backbones as highly stable and conductive anion exchange membranes," Journal of Membrane Science, vol. 653, Article 120487, 2022 (Available online Mar. 21, 2022), 11 pages.

Morimitsu, K., et al., "Ion Exchange Membranes (IEMs) With Ionic Ligand-Metal Complexes and Methods Thereof," U.S. Appl. No. 18/169,098, filed Feb. 14, 2023, 17 pages.

Yuan, Y., et al., "Preparation of an Anion Exchange Membrane by Pyridine-Functionalized Polyether Ether Ketone To Improve Alkali Resistance Stability for an Alkali Fuel Cell," Energy Fuels, vol. 35, No. 4, Feb. 1, 2021, pp. 3360-3367.

Extended European Search Report for European Application No. 23193647.7 dated Feb. 5, 2024, 9 pages.

Extended European Search Report for European Application No. 23193651.9 dated Feb. 2, 2024, 18 pages.

Extended European Search Report mailed in EP 23193650.1 on Feb. 19, 2024. (9 pages).

Extended European Search Report mailed in EP 23196462.8 on Mar. 12, 2024. (8 Pages).

Wikipedia, "Sulfinic acid," Wikipedia—The Free Encyclopedia, Wikipedia.org, 2025, 3 pages, retrieved from the internet on Jul. 9, 2025: https://en.wikipedia.org/w/index.php?title=Sulfinic_acid&oldid=1295112493.

Kalla et al., "Acylation of Phenols, Alcohols, Thiols, Amines and Aldehydes Using Sulfonic Acid Functionalized Hyper-Cross-Linked Poly(2-naphthol) as a Solid Acid Catalyst," Catalysis Letters, vol. 149, 2019 (Published online May 17, 2019), pp. 2696-2705.

Agnew, N.H., "Transition Metal Complexes of Poly(vinylpyridines)," Journal of Polymer Science: Polymer Chemistry Edition, vol. 14, 1976, pp. 2819-2830.

Li et al., "Defective 2D Covalent Organic Frameworks for Postfunctionalization," Advanced Functional Materials, vol. 30, Article 1909267, 2020 (Published online Jan. 21, 2020), 9 pages.

Guo et al., "A quaternary-ammonium-functionalized covalent organic framework for anion conduction," CrystEngComm (The Royal Society of Chemistry), vol. 19, 2017 (Published on Apr. 18, 2017), pp. 4905-4910 (7 pages total).

* cited by examiner

PHYSICALLY REINFORCED STRUCTURED ORGANIC FILM (SOF) ANION EXCHANGE MEMBRANES (AEMs)

TECHNICAL FIELD

The present teachings relate generally to ionic exchange membranes and, more particularly, to anionic exchange membranes having components integrated into the structure of the membranes providing physical reinforcement.

BACKGROUND

Ion-exchange membranes (IEM) can be used in many electrochemical devices including fuel cells, redox flow batteries, electrolyzers, reverse electrodialysis cells, and bioelectrochemical systems (BES) such as microbial fuel cells. IEMs are usually composed of hydrophobic substrates with immobilized ion-functionalized groups and mobile counter-ions. Depending on the type of ionic groups being transported, the IEMs can be anion exchange membranes (AEMs) or cation exchange membranes (CEMs). The commercial membranes available can contain imidazolium, alkylammonium or other non-disclosed quaternary ammonium salts.

In addition to having exceptional alkaline stability, piperidinium based quaternary ammonium compounds exhibit ion exchange capacities (IEC) well within or exceeding the range of these commercial materials, up to ~4.4 meq/g. This stability is advantageous for a viable commercial system when the ion exchange material is constantly subjected to alkaline conditions as part of an electrochemical cell, be it for a fuel cell or $CO_2$ reduction. There are several commercial anion exchange membranes available today, including Fumasep® FAA3, A201, AEMION, Sustanion® and Orion TMI Durion™. Best case scenarios under operating conditions for Sustanion®, A201 and Fumasep® FAA3 are 2000 h, 1000 h and 1000 h respectively. AEMs that included piperidinium or pyridinium ionic groups have also shown high alkaline stability, with up to 99+% retention of IEC and conductivity after 600 h in 2M KOH at 80 C.

Structured organic films can be used as alternate materials in ion exchange membranes. A significant drawback of existing structured organic film (SOF) materials is the brittle nature of resultant free standing film having SOF components. These films can be compromised when subjected to mechanical stresses which can cause cracks or defects that would be detrimental to electrochemical cell functionality. Cracks or holes in the films result in a shorting of an electrochemical cell due to water crossover. In addition, the brittle nature would make scale up of membrane materials difficult as a standard roll to roll process would not be viable. The brittle nature of the films can be due to the high aromaticity of some of the SOF building blocks, which are known to result in brittle materials.

Therefore, it is desirable to fabricate ion exchange membranes synthesized from robust, SOF-based films that can be used in a variety of applications such as fuel cells, redox flow batteries, electrolyzers, reverse electrodialysis cells, and microbial fuel cells without exhibiting shortfalls in performance based on the development of the aforementioned defects.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A structured organic film (SOF) composite is disclosed, including a structured organic film (SOF), which may include a plurality of segments: a plurality of linkers, where at least one of the plurality of linkers connects at least one of the plurality of segments. The composite also includes a polymer additive incorporated into the SOF. Implementations of the structured organic film (SOF) composite include where the polymer additive is present in the SOF in a plurality of nanodomains. A size of the nanodomains is from about 50 nm to about 1 micron. The polymer additive may include a polysulfone. The polysulfone can be poly(oxy-1, 4-phenylenesulfonyl-1,4-phenylene). The polymer additive is present in an amount of from about 5 wt % to about 25 wt % based on a total weight of the SOF composite. The structured organic film (SOF) composite may include an ionic segment. The structured organic film (SOF) composite may include an ionic capping segment. A thickness of the SOF can be from about 250 nm to about 500 μm. The structured organic film (SOF) has an ion exchange capacity (IEC) of from about 0.25 meq/g to about 5.00 meq/g. The structured organic film (SOF) has an electrical conductivity of from about 15 ms/cm to about 50 ms/cm. An ion-exchange membrane, may include the structured organic film (SOF) composite. The structured organic film (SOF) composite can be free-standing.

Another structured organic film (SOF) composite is disclosed, which can include a first domain having a first composition, and a second domain having a second composition and incorporated into the first domain, and where the first composition may include a plurality of segments, and a plurality of linkers, where at least one of the plurality of linkers connects at least one of the plurality of segments, and the second composition may include a polymer additive. Implementations of the structured organic film (SOF) composite can include where a size of the second domain is from about 50 nm to about 1 micron. At least one of the plurality of segments may include a piperidinium-based quaternary ammonium compound, a pyridinium-based quaternary ammonium compound or a combination thereof. The structured organic film (SOF) composite may include a plurality of capping segments. The plurality of capping segments may include benzyl tris(2-hydroxyethyl) ammonium (BTHEA), n-hydroxyethyl-1,2,4,5-tetramethylimidazolium (NEtTMIm), or a combination thereof.

Another structured organic film (SOF) composite is disclosed, including a plurality of segments, and a plurality of linkers, where at least one of the plurality of linkers connects at least one of the plurality of segment: where at least one or more of the plurality of segments may include N,N,N',N'-tetrakis-[(4-hydroxymethyl)phenyl]-biphenyl-4,4'-diamine (THM-TBD). The composite also includes a polysulfone incorporated into the SOF.

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

Figure 1:
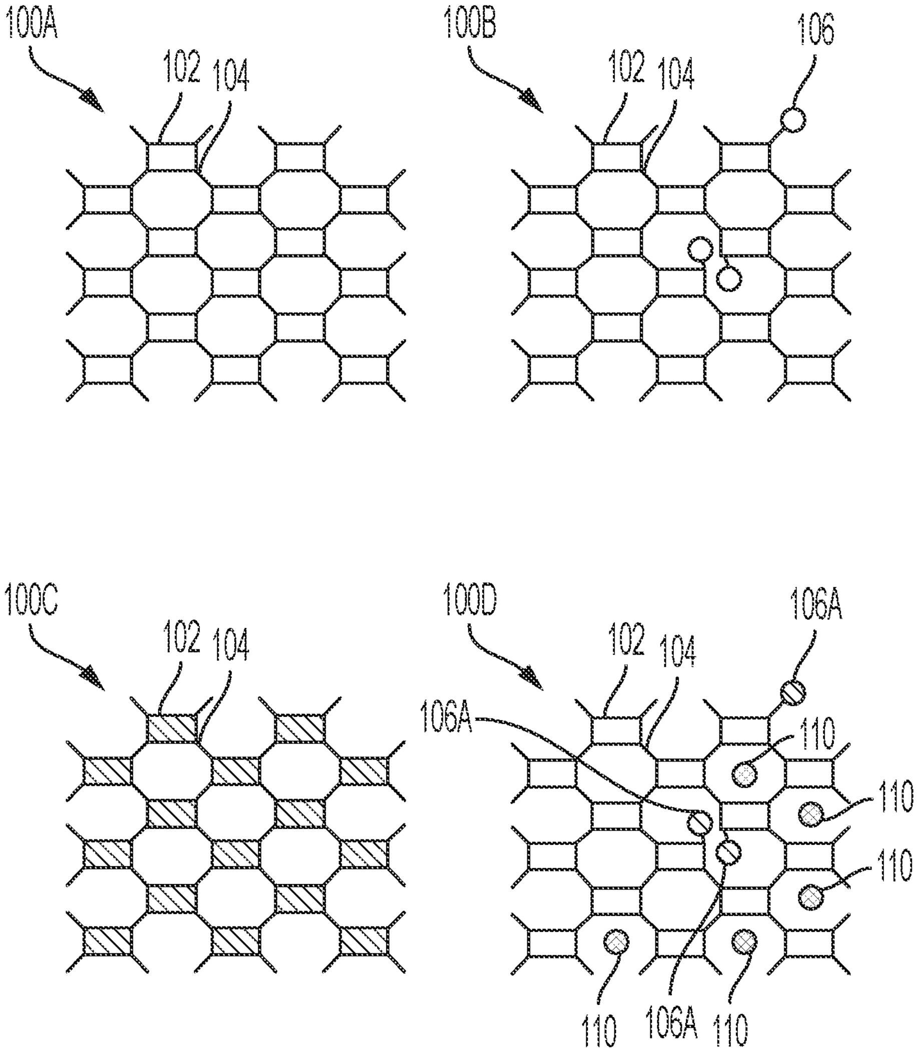
FIG. 1 illustrates the differences between a standard structured organic film, a structured organic film having a capping segment, a structured organic film having molecular building blocks with ionic functionality, and a structured organic film having a capping segment with ionic functionality and other features, in accordance with the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

"Structured organic film" (SOF) refers to a COF that is a film at a macroscopic level. The SOFs of the present disclosure have a capping segment or group added into the SOF formulation, which (after film formation), ultimately bonds to the SOF via at least one functional group located on the capping segment. SOFs of the present disclosure in certain examples can have non-ionic or ionic character, including cationic or anionic. This ionic character can be imparted by either a charged molecular building block or a capping group in the SOF structure.

In this specification and the claims that follow, singular forms such as "a," "an," and "the" include plural forms unless the content clearly dictates otherwise.

The term "SOF" generally refers to a covalent organic framework (COF) that is a film at a macroscopic level. The phrase "macroscopic level" refers, for example, to the naked eye view of the present SOFs. Although COFs are a network at the "microscopic level" or "molecular level" (requiring use of powerful magnifying equipment or as assessed using scattering methods), the present SOF is fundamentally different at the "macroscopic level" because the film is for instance orders of magnitude larger in coverage than a microscopic level COF network. SOFs described herein have macroscopic morphologies much different than typical COFs previously synthesized. Films as presently disclosed in a free-standing film example, or as coated onto a surface, include but are not limited to, a top surface and a bottom surface, in which "top" and "bottom" can be dependent on a temporal orientation or position of the film. Furthermore, a surface is still considered a surface even if adhered or bound to a substrate or other material. Films as presently disclosed in a free-standing film example, or as coated onto a surface, also include one or more edges, which can be, but are not limited to, one or more boundaries between where a film is present and where a film is not present. Free-standing films are further not adhered to a substrate or a supporting structure after curing and may be removed from a coating mandrel or coating support to be used in another configuration or form as compared to an as-coated state.

Additionally, when a capping segment is introduced into the SOF, the SOF framework is locally 'interrupted' where the capping segments are present. These SOF compositions are 'covalently doped' because a foreign molecule is bonded to the SOF framework when capping segments are present. Capped SOF compositions may alter the properties of SOFs without changing constituent building block segments. For example, the mechanical and physical properties of the capped SOF where the SOF framework is interrupted may differ from that of an uncapped SOF or an SOF without capping segments.

The SOFs of the present disclosure are at the macroscopic level substantially pinhole-free SOFs or pinhole-free SOFs having continuous covalent organic frameworks that can extend over larger length scales such as for instance much greater than a millimeter to lengths such as a meter and, in theory, as much as hundreds of meters. It will also be appreciated that SOFs tend to have large aspect ratios where typically two dimensions of a SOF will be much larger than the third. SOFs have markedly fewer macroscopic edges and disconnected external surfaces than a collection of COF particles.

In examples, a "substantially pinhole-free SOF" or "pinhole-free SOF" may be formed from a reaction mixture deposited on the surface of an underlying substrate. The term "substantially pinhole-free SOF" refers, for example, to an SOF that may or may not be removed from the underlying substrate on which it was formed and contains substantially no irregular pinholes, blisters, ruptures, or gaps, such as those that would be considered coating defects that could form such as when a bubble ruptures during a film formation that is greater than the distance between the cores of two adjacent segments per square cm: such as, for example, less than 10 pinholes, pores or gaps greater than about 250 nanometers in diameter per $cm^2$, or less than 5 pinholes, pores or gaps greater than about 100 nanometers in diameter per $cm^2$. The term "pinhole-free SOF" refers, for example, to an SOF that may or may not be removed from the underlying substrate on which it was formed and contains no unintended pinholes or gaps greater than the distance between the cores of two adjacent segments per $micron^2$, such as no pinholes or gaps greater than about 500 Angstroms in diameter per $micron^2$. Pores that are intentionally and uniformly introduced into SOFs as tunable features for transport via a membrane are distinguished from pinholes for the purposes of this disclosure.

For the purposes of the present disclosure, a nanodomain is a single nanometer-scale cluster while nanodomain or nanodomains could refer to a plurality of nanometer-scale clusters of a polymer found within a bulk matrix or first domain of a film or polymer. In examples, the second material domains or nanodomains and the matrix polymer are different, but some examples, they may have the same composition. Under magnification, each nanodomain can range from about 50 nm to about 100 nm, or from about 50 nm to about 1 micron. In examples, the nanodomain or plurality of nanodomains can be formed as a solid dispersion or suspension when forming a polymer film or other film, such as an SOF film. For example, a nanometer scale cluster of an additive material in an SOF matrix can be provided by examples of the present teachings. Scale length of the additive nanodomain can be up to 1 micron, including a size from about 50 nm to about 1000 nm, or from about 250 nm to about 1000 nm, or from about 250 nm to about 500 nm.

The present disclosure provides the incorporation of a high strength, flexible polymer into a structured organic film (SOF) such that the mechanical strength of a resultant SOF-IEM can be improved in order to reduce films defects. A more robust film consequently provides the capability to fabricate such membranes thinner, which decreases electrical resistance and lower material costs. In the present teachings a polymer reinforcement of an SOF-AEM is provided with polymers, such as poly(oxy-1,4-phenylenesulfonyl-1,4-phenylene), a polyethersulfone (PES). Described herein is a new class of SOF-based anion exchange membranes reinforced with poly(oxy-1,4-phenylenesulfonyl-1,4-phenylene)(poly(ethersulfone), or PES) to impart improved mechanical robustness and gas permeability, even at very thin coating thicknesses (<10 μm). These materials can be used in electrochemical applications such as $CO_2$ reduction, fuel cells, and other applications. This polymer additive-reinforced SOF network can also be referred to as a structured organic film (SOF) composite, as these SOF composites can be produced from two or more constituent materials, namely an SOF with a polymer additive. These constituent materials can have dissimilar chemical or physical properties and are combined in a composite via standard SOF fabrication procedures to create a material with properties unlike the individual elements. For example, SOF films can be brittle when produced in thin film form, but are tougher and more resilient with polymer additives of the present teachings. Also, polymer additives used in the present SOF composites do not necessarily possess electrical conductivity or ion-exchange properties as the SOF materials on their own. Within the SOF composite, the individual elements remain separate and distinct, in examples, in respective nanodomains, and can be distinguished from other mixtures or solid solutions.

Further provided are structured organic films (SOF) composed of segments or building blocks where the primary building block or segment has no charge but includes four functional groups for linking, while a secondary component includes a charged or ionic species. The charged species, in examples, can have two functional groups (fg=—OH), creating a fully crosslinked SOF network. These SOF AEMs are easily controlled in terms of structure compared to polymers which need to be simultaneously copolymerized and crosslinked. Additionally, SOFs of the present disclosure offer greater control over the distribution of the cationic charge groups with similar, if not better, IEC than existing IEMs. The SOFs of the present disclosure provide high charge density (IEC) and ionic conductivity, are extremely robust to alkaline conditions, robust to harsh solvents such as but not limited to THF, Dowanol, or DMSO, and provide a physically robust film, while increasing viscosity of the SOF-AEM formulation during coating, which facilitates processing. Such materials can be used in in membrane electrode assemblies (MEA) for $CO_2$ conversion, fuel cells, electrochemical cells, redox flow batteries, and the like.

The polymer used for reinforcement should be soluble in the solvent system for fabricating the SOF films of the present disclosure, should be compatible with all other components, be alkaline and thermally stable, while not negatively impacting the ionic properties of the membrane, such as IEC or electrical conductivity. Incorporation of reinforcing polymers further enhances gas permeability, while increasing the viscosity of the formulation which thereby reduces coating defects.

Molecular Building Block

The SOFs of the present disclosure comprise molecular building blocks also referred to as building block segments having a segment (S) and functional groups (Fg). Molecular building blocks require at least two functional groups (x≥2) and may comprise a single type or two or more types of functional groups. Functional groups are the reactive chemical moieties of molecular building blocks that participate in a chemical reaction to link together segments during the SOF forming process. A segment is the portion of the molecular building block that supports functional groups and comprises an atoms that are not associated with functional groups. Further, the composition of a molecular building block segment remains unchanged after SOF formation.

Functional Group

Functional groups are the reactive chemical moieties of molecular building blocks that may participate in a chemical reaction to link together segments during the SOF forming process. Functional groups may be composed of a single atom, or functional groups may be composed of more than one atom. The atomic compositions of functional groups are those compositions normally associated with reactive moieties in chemical compounds. Non-limiting examples of functional groups include halogens, alcohols, ethers, ketones, carboxylic acids, esters, carbonates, amines, amides, imines, ureas, aldehydes, isocyanates, tosylates, alkenes, alkynes and the like. Other examples can include, but are not limited to haloformyls, oxygen containing groups (e.g. hydroxyls, anhydrides, carbonyls, carboxyls, carbonates, carboxylates, aldehydes, esters, hydroperoxy, peroxy, ethers, and orthoesters), nitrogen-containing groups (e.g. carboxamides, amines, imines, imides, azides, azos, cyanates, isocyanates, nitrates, nitriles, isonitriles, nitrosos, nitros, nitrosooxy), sulfur-containing groups (sulfhydryls, sulfides, disulfides, sulfinyls, sulfos, thiocyanates, isothiocyanates, and carbonothioyls), phosphorous-containing groups (e.g. phosphinos, phosphonos, and phosphates), silicon-containing groups (Si(OH)3, Si(SH)4, silanes, silyls, and siloxanes), boron containing groups (e.g. boronic acid, boronic esters, and boronic ethers), metal or metalloid-containing groups (e.g. $Ge(OH)_3$, $Ge(SH)_4$, $AsO_3H$, $AsO_4H$, $As(SH)_3$, $Sn(OH)_3$, $Sn(CH_3)_3$, and $Sn(Bu)_3$), or combinations thereof.

Molecular building blocks contain a plurality of chemical moieties, but only a subset of these chemical moieties are intended to be functional groups during the SOF forming process. Whether or not a chemical moiety is considered a functional group depends on the reaction conditions selected for the SOF forming process. Functional groups (Fg) denote a chemical moiety that is a reactive moiety, that is, a functional group during the SOF forming process.

In the SOF forming process the composition of a functional group will be altered through the loss of atoms, the gain of atoms, or both the loss and the gain of atoms: or, the functional group may be lost altogether. In the SOF, atoms previously associated with functional groups become associated with linker groups, which are the chemical moieties that join together segments. Functional groups have characteristic chemistries and those of ordinary skill in the art can generally recognize in the present molecular building blocks the atom(s) that constitute functional group(s). It should be noted that an atom or grouping of atoms that are identified as part of the molecular building block functional group may be preserved in the linker group of the SOF. Linker groups are described below.

Capping Segments, Ionic Capping Segments, and Ionic Building Blocks Segments

Capping segments of the present disclosure are molecules that 'interrupt' the regular network of covalently bonded building blocks normally present in an SOF and may further incorporate an ionic charging functionality into the SOF network. An SOF including one or more capping segments may also be referred to as capped SOFs. The differences between a SOF and SOFs having capping segments, capping segments having ionic functionality, or molecular building blocks having ionic functionality are illustrated in FIG. 1. FIG. 1 illustrates the differences between a standard structured organic film, a structured organic film having a capping segment, a structured organic film having molecular building blocks with ionic functionality, and a structured organic film having a capping segment with ionic functionality. Various networks of SOFs are shown, wherein a typical SOF network 100A is shown, having several segments 102 connected by several linkers 104. Another SOF network 100B is representative of a capped SOF network 100B having several segments 102 connected by several linkers 104, wherein a capping segment 106 closes off or terminates a branch of the segment 102. In SOF network 100C, a plurality of segments having ionic functionality, also referred to as an ionic building block 102A are shown to be connected by linkers 104. In SOF network 100D, a plurality of segments 102 connected by several linkers 104 are illustrated, wherein a capping segment having an ionic group 106A closes off or terminates a branch of the segment 102. Capping segments can be absent an ionic group as in capping segment 106 or have an ionic group as in capping segment 106A, but have only one linking functional group (Fg) that reacts to terminate or close off a branch of a segment 102 of an SOF. In addition, the SOF network 100D includes a polymer additive nanodomain 110 incorporated into the SOF network. It should be noted that the polymer additive nanodomain 110 appears and is present as a distinct second composition physically entrained within the SOF network 100D, even without being chemically crosslinked or otherwise incorporated into the SOF network 100D. The ionic group on a capping segment can have ionic character initially or via a chemical reaction or treatment in a post-processing step after formation of the SOF. Molecular building blocks can be absent an ionic group as in segment 102 or have an ionic group as in ionic building block 102A. Molecular building blocks 102, 102A also have more than one linking Fg that reacts with the SOF to form the SOF network. The ionic group on a molecular building block can have ionic character initially or via a chemical reaction or treatment in a post-processing step after formation of the SOF. While the exemplary SOF networks 100A, 100B, 100C, 100D illustrate the inclusion of various components to an SOF network of the present disclosure, they are non-limiting, and certain examples of SOF networks of the present disclosure can have some or all of the various segments, linkers, capping segments, ionic capping segments, molecular building blocks, ionic molecular building blocks, or combinations thereof.

Capped SOF compositions or SOF compositions having ionic groups in either the segments or molecular building blocks, or capping segments can provide tunable materials whose properties can be varied through the type and amount of ionic groups introduced. Conventional membranes used in IEC or charged membrane applications are typically made by providing a polymer or network backbone, followed by subsequent introduction of a charge functionality. Examples of the present disclosure provide structured organic networks where during synthesis, ionic or charged capping segments or alternatively ionic or charged molecular building blocks are incorporated into the structured organic network. As noted previously, in certain examples, charge can be either present upon network formation or induced after network formation by a chemical reaction or post-processing step such as, but not limited to those as described herein. For purposes of the present disclosure, a capping segment having an ionic group prior to processing or after processing or formation may be referred to as an ionic capping segment. Furthermore, a molecular building block having an ionic group prior to processing or after processing or formation may be referred to as an ionic molecular building block or ionic building block or ionic segment. SOFs having an ionic character may alternatively be referred to as ionic structured organic films (iSOFs)

In embodiments, the capping segments have a structure that is unrelated to the structure of any of the molecular building blocks that are added into the SOF formulation, which (after film formation) ultimately becomes the SOF. In other words, a capping segment is the portion of a capping group or capping unit that supports functional groups and comprises atoms that are not associated with functional groups. Further, the composition of a capping segment remains unchanged after SOF formation.

A capping segment molecule has one functional group that has suitable or complementary functional groups (as described above) to participate in a chemical reaction to link to another segment during the SOF forming process. A second chemical moiety that is not suitable or complementary to participate in the specific chemical reaction to link together segments during the SOF forming process and thus cannot bridge any further adjacent molecular building blocks. However, after the SOF is formed such functional groups may be available for further reaction with additional components and thus allowing for the further refining and tuning of the various properties of the formed SOF. Ionic species such as anionic or cationic species such as ionic (including cationic or anionic) molecular building block segments and capping groups can be used in SOF films useful for cation exchange membranes, anion exchange membranes, and the like.

SOFs having capping segments or capping segment precursors may further include capping segments that directly provide an ionically charged functionality, or alternatively can be capping segments that can be induced to have ionic charge during or after film formation processes. While such reactions are possible with piperidinium, spirobipiperidinium, and spirobipyrrolidinium compounds, the charged N+ ion is inherent. In certain examples, various counter ions may be exchanged with the ionically charged functionality.

In embodiments, the SOF may comprise a mixture of capping segments, such as any combination of a first capping segment, a second capping segment, a third capping segment, a fourth capping segment, etc., where the structure of the capping segment varies. In embodiments, the structure of a capping segment or a combination of multiple capping segments may be selected to either enhance or attenuate the chemical and physical properties of SOF: or the identity of the chemical moieties or functional group(s) on that are not suitable or complementary to participate in the chemical reaction to link together segments during the SOF forming process may be varied to form a mixture of capping segments. Thus, the type of capping segment introduced into the SOF framework may be selected to introduce or tune a desired property of SOF.

In embodiments, a SOF contains segments, which are not located at the edges of the SOF, that are connected by linkers to at least three other segments and/or capping groups. For example, in embodiments the SOF comprises at least one symmetrical building block selected from the group consisting of ideal triangular building block segments, distorted triangular building block segments, ideal tetrahedral building block segments, distorted tetrahedral building block segments, ideal square building block segments, and distorted square building block segments. In embodiments, Type 2 and 3 SOFs contains at least two segment types, which are not located at the edges of the SOF, where at least one segment type is connected by linkers to at least three other segments and/or capping groups. For example, in embodiments the SOF comprises at least one symmetrical building block selected from the group consisting of ideal triangular building block segments, distorted triangular building block segments, ideal tetrahedral building block segments, distorted tetrahedral building block segments, ideal square building block segments, and distorted square building block segments. In embodiments, an SOF or a pre-cure solution thereof can include one or more pre-linker that is dissolved in solution, forming a linker in the SOF upon curing.

In embodiments, the SOF comprises a plurality of segments, where all segments have an identical structure, and a plurality of linkers, which may or may not have an identical structure, wherein the segments that are not at the edges of the SOF are connected by linkers to at least three other segments and/or capping groups. In embodiments, the SOF comprises a plurality of segments where the plurality of segments comprises at least a first and a second segment that are different in structure, and the first segment is connected by linkers to at least three other segments and/or capping groups when it is not at the edge of the SOP.

In embodiments, the SOF comprises a plurality of linkers including at least a first and a second linker that are different in structure, and the plurality of segments either comprises at least a first and a second segment that are different in structure, where the first segment, when not at the edge of the SOF, is connected to at least three other segments and/or capping groups, wherein at least one of the connections is via the first linker, and at least one of the connections is via the second linker: or comprises segments that all have an identical structure, and the segments that are not at the edges of the SOF are connected by linkers to at least three other segments and/or capping groups, wherein at least one of the connections is via the first linker, and at least one of the connections is via the second linker.

In embodiments, the capping segments have a structure that substantially corresponds to the structure of one of the molecular building blocks (such as the molecular building blocks for SOFs that are detailed in U.S. Pat. Nos. 8,093,347; 8,436,130; 8,357,432; 8,394,495; 8,389,060; 8,318,892; and 9,097,995, which have been incorporated by reference) that is added to the SOF formulation, but one or more of the functional groups present on the building block is either missing or has been replaced with a different chemical moiety or functional group that will not participate in a chemical reaction (with the functional group(s) of the building blocks that are initially present) to link together segments during the SOF forming process.

A capping segment having a structure unrelated to the molecular building block or segment in the SOF may be, for example, an alkyl moiety (for example, a branched or unbranched saturated hydrocarbon group, derived from an alkane and having the general formula CnH2n+1, in which n is a number of 1 or more) in which one of the hydrogen atoms has been replaced by an —OH group. In such a formulation, a reaction between the capping segment and the molecular building block or segment, for example, a reaction between the alcohol (—OH) groups, would link the capping segment and the molecular building blocks together through the formation of (linking) ether groups. Other functional group reactions as described herein are applicable as well.

In embodiments, the capping segment molecules are mono-functionalized. For example, in embodiments, the capping segments comprise only a single suitable or complementary functional group (as described above) that participates in a chemical reaction to link together segments during the SOF forming process and thus cannot bridge any further adjacent molecular building blocks (until a building block with a suitable or complementary functional group is added, such as when an additional SOF is formed on top of a capped SOF base layer and a multilayer SOF is formed).

When such capping segments are introduced into the SOF coating formulation, upon curing, interruptions in the SOF framework are introduced. Interruptions in the SOF framework are therefore sites where the single suitable or complementary functional group of the capping segments have reacted with the molecular building block and locally terminate (or cap) the extension of the SOF framework and interrupt the regular network of covalently bonded building blocks normally present in an SOF. The type of capping segments (or structure of the capping segment) introduced into the SOF framework may be used to tune the properties of the SOF.

In embodiments, the capping segment molecules may comprise more than one chemical moiety or functional group. For example, the SOF coating formulation, which (after film formation), ultimately becomes bonded in the SOF may comprise a capping segment having at least two or more chemical moieties or functional groups, such as 2, 3, 4, 5, 6 or more chemical moieties or functional groups, where only one of the functional groups is a suitable or complementary functional group (as described above) that participates in a chemical reaction to link together segments during the SOF forming process. The various other chemical moieties or functional groups present on the molecular building block are chemical moieties or functional groups that are not suitable or complementary to participate in the specific chemical reaction to link together segments initially present during the SOF forming process and thus cannot bridge any further adjacent molecular building blocks. However, after the SOF is formed such chemical moieties and/or functional groups may be available for further reaction (similar to dangling functional groups, as discussed below) with additional components and thus allow for the further refining and tuning of the various properties of the formed SOF, or chemically attaching various other SOF layers in the formation of multilayer SOFs.

Examples of suitable capping segments can be anionic or cationic species. For example, anionic species such as anionic molecular building block segments and anionic capping groups for use in SOF films useful for cationic exchange membranes of the present disclosure can include several chemical species as noted in the following tables. Sulfonic acid or sulfinic acid derivatives including linear alkyl derivatives, benzene derivatives, and naphthalene derivatives can be used as capping segments or capping groups in the fabrication of SOFs for use in cationic exchange membranes. Examples of linear alkyl derivatives of hydroxysulfonic acids or hydroxysulfinic acids include compounds with the following structures:

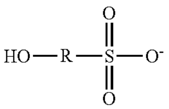

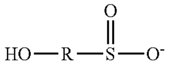

where R=—$(CH_2)_n$, where n is from 0 to about 10. Illustrative examples include 2-hydroxyethane sulfonic acid, 3-hydroxypropane-1-sulfonic acid, hydroxymethylsulfinic acid, 1-hydroxyethylsulfinic acid, 1-hydroxypropylsulfinic acid, 1-hydroxybutylsulfinic acid, 1-hydroxy-1-methylethylsulfinic acid, 1-hydroxy-1-ethylpropylsulfinic acid, 1-hydroxy-1-methylpropylsulfinic acid, 1-hydroxy-1-methylpentylsulfinic acid, and the like, or combinations thereof.

Examples of derivatives of hydroxybenzenesulfonic acids or hydroxybenzenesulfinic acids include compounds with the following structures:

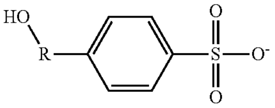

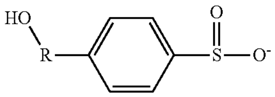

where R=—$(CH_2)_n$, where n is from 0 to about 10. In certain examples, Fg may be greater than 1, for example, with catechol-3,5-disulfonic acid where Fg=2.

Illustrative examples of derivatives of hydroxybenzenesulfonic acids or hydroxybenzenesulfinic acids include 4-hydroxybenzene sulfonic acid, 4-hydroxybenzene sulfinic acid, 3-hydroxybenzene sulfonic acid, 3-hydroxybenzene sulfinic acid, and the like, or combinations thereof.

Examples of derivatives of hydroxynaphthalene sulfonic acids or hydroxynaphthalene sulfinic acids include compounds with the following general structures:

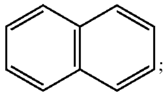;

substituted with one or more of the following:

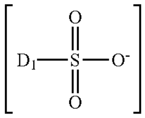

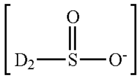

$[D_1—OH]$

For example, when the naphthalene derivative is substituted with sulfonic ($D_1$) or sulfinic ($D_2$) acid with an alcohol or hydroxy group ($D_1$) are all equal to 1, illustrative compounds include 4-hydroxy-2-naphthalene sulfonic acid, 7-hydroxy-2-naphthalene sulfonic acid, 4-hydroxy-1-naphthalene sulfonic acid, and 6-hydroxy-2-naphthalene sulfonic acid. When the naphthalene derivative is substituted with sulfonic ($D_1$) or sulfinic ($D_2$) acid equal to 2, and with an alcohol or hydroxy group ($D_1$) equal to 1, illustrative compounds include 4-hydroxy-2,7-naphthalene disulfonic acid or 3-hydroxy-2,7-naphthalene disulfonic acid. When the naphthalene derivative is substituted with sulfonic ($D_1$) or sulfinic ($D_2$) acid equal to 1, and with an alcohol or hydroxy group ($D_1$) equal to 2, illustrative compounds include 4,6-dihydroxynaphthalene-2-sulfonic acid or 6,7-dihydroxynaphthalene-2-sulfonic acid. When the naphthalene derivative is substituted with sulfonic ($D_1$) or sulfinic ($D_2$) acid equal to 2, and with an alcohol or hydroxy group ($D_1$) equal to 2, illustrative compounds include disodium chromotropate dihydrate or mordent brown dihydrate, or 3,6-dihydroxy naphthalene-2,7-disulfonic acid. While exemplary examples have been described herein, any number of suitable substitutions or permutations of the hydroxynaphthalene sulfonic acids or hydroxynaphthalene sulfinic acids can be applicable capping segment precursor compounds.

SOFs may further include molecular building blocks, also referred to as segments, that directly provide an ionically charged functionality, or alternatively can be segments that can be induced to have ionic charge during or after film formation processes. These ionic segments may also have structural features providing flexibility to an SOF network material that also provide steric hindrance such that when subjected to alkaline or other harsh chemical environments, they impart improved chemical stability to the SOF. This improved stability can include ionic charging stability, physical property stability, SOF integrity, among other properties during service or use.

For example, a class of quaternary ammonium, crosslinkable ionic building blocks (segments) for anion exchange membranes (AEMs) can provide increased flexibility of an SOF membrane while retaining or increasing the IEC and alkaline stability of previously known SOF-AEMs. Examples of the present disclosure include structured organic films (SOF) composed of building blocks (segments) where a primary building block has no charge but includes four functional groups for linking, and a secondary ionic segment that includes a charged (or ionic) species. This ionic segment can include at least two functional groups (fg), where fg=—OH, for example, creating a fully crosslinked SOF network. These ionic segments can provide SOFs with higher charge density with improved control over distribution of cationic charge groups within an SOF network. Further, these ionic segments which can include piperidinium and pyridinium groups, can impart physically robust SOF-based films that provide robustness to alkaline conditions, and harsh solvents such as, but not limited to, THF, Dowanol, and DMSO. [In the present disclosure, ionic segments are provided, including NHM4PipMBr and NH4MPyBr. In general, descriptors for these molecules can include molecules having an Fg=2 or greater, ionic character, and a ring system containing a positively charged N group with at least 2 functional groups, such as piperidine and pyridine systems but also including derivatives of piperazine, pyrazine, DABCO (1,4-diazabicyclo[2.2.2]octane), imidazole, and the like. Standard quaternization chemistry would apply in the synthesis of such compounds.

Additional cationic species can include imidazolium-containing SOF films having improved alkaline stability. Illustrative examples of imidazolium compounds useful for providing IEC and alkaline stability to SOF films for anion exchange membranes include N-hydroxyethyl-1,2,4,5-tetramethylimidazolium bromide (NETMImBr), N-hydroxypropyl-1,2,4,5-tetramethylimidazolium bromide (NPTMImBr), or combinations thereof. Illustrative examples can include alkyl/aryl precursors having an alcohol functional group and a primary halogen to undergo the quaternization reaction. Examples can include, but are not limited to, 4-bromobutan-1-ol. 5-bromopentan-1-ol. 3-bromo-1,2-propanediol etc. or 4-(2-bromoethyl) phenol or combinations thereof. Other examples of capping segments can include benzyl tris(2-hydroxyethyl) ammonium (BTHEA), benzyl (2-hydroxyethyl)dimethylammonium chloride, choline, and others.

Cationic species can include piperidinium-containing SOF films having improved alkaline stability. Illustrative examples of piperidinium compounds useful for providing IEC and alkaline stability to SOF films for anion exchange membranes include bicyclic piperidinium groups, piperidinium-based N-cyclic ammonium, or combinations thereof. Illustrative examples can include, but are not limited to, 3-methanol-6-Azoniaspiro[5.5]undecane bromide (MeASUBr). Additional illustrative examples include piperidinium-based groups having counterions other than bromide, such a chloride, hydroxide, fluoride, bicarbonate, nitrate, acetate, or combinations thereof. Thus, 3-methanol-6-Azoniaspiro[5.5]undecane (MeASU) may be reacted with counterions other than bromide, as described herein. Other illustrative examples include spirobipyrrolidinium and spirobipiperidinium compounds. In other examples, the ionic group can include compounds where the ring structure includes a $(CH_2)_n$, where n is a number from 4 to 8. It should be noted that ring stability may be impacted in certain compounds within the range of 4 to 8. In one general example, if n is equal to 5, the compound could be classified as a spirobipyrrolidinium instead of a spirobipiperidinium. In other examples, the compound may include variates of hydroxyl group positions, counter ion salts, and alkyl appendages. Alkyl appendages can be linear or branched, and on any C-position on the rings, or can be a plurality of appendages on a ring. Appendages can include heteroatoms such as nitrogen, oxygen, sulfur, or combinations thereof. Examples relevant to this disclosure include compounds as noted, but including Fg>2, where the compounds behave as segments or molecular building blocks having ionic character, rather than capping segments that terminate an SOF chain with an ionic group. In examples, at least one of the plurality of segments of the SOF materials comprises a piperidinium-based quaternary ammonium compound, a pyridinium-based quaternary ammonium compound or a combination thereof. The piperidinium-based quaternary ammonium may compound include N-hydroxyethylmethyl-4-piperidiniummethanol (NHM4PiP). At least one of the plurality of segments may include a pyridinium-based quaternary ammonium compound. The pyridinium-based quaternary ammonium compound may include N-hydroxyethyl-4-pyridiniummethanol (NH4MPy). The structured organic film (SOF) may include a plurality of capping segments. The plurality of capping segments may include benzyl tris(2-hydroxyethyl) ammonium (BTHEA), N-hydroxyethyl-1,2,4,5-tetramethylimidazolium (NEtTMIm), or a combination thereof.

SOFs having capping segments or capping segment precursors may further include capping segments that directly provide an ionically charged functionality, or alternatively can be capping segments that can be induced to have ionic charge during or after film formation processes. While such reactions are possible with piperidinium, spirobipiperidinium, and spirobipyrrolidinium compounds, the charged N+ ion is inherent. In certain examples, various counter ions may be exchanged with the ionically charged functionality.

In embodiments, the molecular building blocks or segments may have x functional groups (where x is two or more), with at least one molecular building block type having at least three functional groups) and the capping segment molecules may comprise a capping segment molecule having 1 functional groups that are suitable or complementary functional group (as described above) and participate in a chemical reaction to link together segments during the SOF forming process.

Segment

A segment is the portion of the molecular building block that supports functional groups and comprises all atoms that are not associated with functional groups. Further, the composition of a molecular building block segment remains unchanged after SOF formation. In embodiments, the SOF may contain a first segment having a structure the same as or different from a second segment. In other embodiments, the structures of the first and/or second segments may be the same as or different from a third segment, forth segment, fifth segment, etc. A segment is also the portion of the molecular building block that can provide an inclined property. Inclined properties are described later in the embodiments. It should be noted that different segment types, as described herein, can be or can include, but are not limited to, one or more building block segments, capping segments, ionic capping segments, ionic building block segments, or combinations thereof.

In specific embodiments, the segment of the SOF comprises at least one atom of an element that is not carbon, such at least one atom selected from the group consisting of hydrogen, oxygen, nitrogen, silicon, phosphorous, selenium, fluorine, boron, and sulfur.

A description of various exemplary molecular building blocks, linkers, SOF types, strategies to synthesize a specific SOF type with exemplary chemical structures, building blocks whose symmetrical elements are outlined, and classes of exemplary molecular entities and examples of members of each class that may serve as molecular building blocks or other components for SOFs are detailed in U.S. Pat. Nos. 8,093,347; 8,436,130; 8,357,432; 8,394,495; 8,389,060; 8,318,892; and 9,097,995, the disclosures of which are totally incorporated herein by reference in their entireties.

Pre-Linker

A pre-linker is a chemical moiety that forms a linker in the SOF upon chemical reaction between functional groups on a molecular building block, capping segment ionic capping segment, or ionic building block. Types of SOF pre-linkers can be or include polyols, such as glycol, diethyleneglycol, polyethylene glycol, glycerol, dipentaerithritol, tripentaerythritol, or 1,1,1-tris(hydroxymethyl) propane. Other illustrative SOF pre-linkers can be or include diamines or polyamines such as 1,2-diaminoethane, 1,3-diaminopropane, 1,8-diaminooctane, propane-1,2,3-triamine, pentane-1,3,5-triamine, benzene-1,3,5-triamine, pentane-1,2,4,5-tetraamine, or butane-1,1,4,4-tetraamine. Other illustrative SOF pre-linkers can be or include diacids or polycarboxylic acids such as oxalic acid, malonic acid, succinic acid, tricarballylic acid, tricarboxylic acid, 1,3,5-cylcohexanetricarboxylic acid, 1,2,3,4,5,6-cyclohexanehexacarboxylicacid, or trimesic acid. Additional illustrative SOF pre-linkers can be or include acid chlorides such as adipoyl chloride, malonyl chloride, succinyl chloride, sebacoyl chloride, terephthalyl chloride, or 1,3,5-benzenetricarbonyl trichloride. Additional illustrative SOF pre-linkers can be or include diethyl oxalate, diethylmalonate, or ethylenediaminetetraacetic acid triethyl ester.

Linker

A linker is a chemical moiety that emerges in a SOF upon chemical reaction between functional groups present on the molecular building blocks and/or capping segments.

A linker may comprise a covalent bond, a single atom, or a group of covalently bonded atoms. The former is defined as a covalent bond linker and may be, for example, a single covalent bond or a double covalent bond and emerges when functional groups on all partnered building blocks are lost entirely. The latter linker type is defined as a chemical moiety linker and may comprise one or more atoms bonded together by single covalent bonds, double covalent bonds, or combinations of the two. Atoms contained in linking groups originate from atoms present in functional groups on molecular building blocks prior to the SOF forming process. Chemical moiety linkers may be well-known chemical groups such as, for example, esters, ketones, amides, imines, ethers, urethanes, carbonates, and the like, or derivatives thereof.

For example, when two hydroxyl (—OH) functional groups are used to connect segments in a SOF via an oxygen atom, the linker would be the oxygen atom, which may also be described as an ether linker. In embodiments, the SOF may contain a first linker having a structure the same as or different from a second linker. In other embodiments, the structures of the first and/or second linkers may be the same as or different from a third linker, etc.

A capping segment may be bonded in the SOF in any desired amount as long as the general SOF framework is sufficiently maintained. For example, in embodiments, a capping segment may be bonded to at least 0.1% of all linkers, but not more than about 40% of all linkers present in an SOF, such as from about 0.5% to about 30%, or from about 2% to about 20%. In embodiments, substantially all segments may be bound to at least one capping segment, where the term "substantially all" refers, for example, to more than about 95%, such as more than about 99% of the segments of the SOF. In the event capping segments bond to more than 50% of the available functional groups on the molecular building blocks (from which the linkers emerge), oligomers, linear polymers, and molecular building blocks that are fully capped with capping segments may predominately form instead of a SOF. In certain examples of SOFs, capping segments may be quantitatively expressed in terms of mol %, concentration, or as ratios compared to either a segment composition or of an entire SOF composition.

In specific embodiments, the linker comprises at least one atom of an element that is not carbon, such at least one atom selected from the group consisting of hydrogen, oxygen, nitrogen, silicon, phosphorous, selenium, fluorine, boron, and sulfur.

Metrical Parameters of SOF's

SOFs have any suitable aspect ratio. In embodiments, SOFs have aspect ratios for instance greater than about 30:1 or greater than about 50:1, or greater than about 70:1, or greater than about 100:1, such as about 1000:1. The aspect ratio of a SOF is defined as the ratio of its average width or diameter (that is, the dimension next largest to its thickness) to its average thickness (that is, its shortest dimension). The term 'aspect ratio,' as used here, is not bound by theory. The longest dimension of a SOF is its length and it is not considered in the calculation of SOF aspect ratio.

Generally, SOFs have widths and lengths, or diameters greater than about 500 micrometers, such as about 10 mm, or 30 mm. The SOFs have the following illustrative thicknesses: about 10 Angstroms to about 250 Angstroms, such as about 20 Angstroms to about 200 Angstroms, for a mono-segment thick layer and about 20 nm to about 5 mm, about 50 nm to about 10 mm for a multi-segment thick layer.

SOF dimensions may be measured using a variety of tools and methods. For a dimension about 1 micrometer or less, scanning electron microscopy is the preferred method. For a dimension about 1 micrometer or greater, a micrometer (or ruler) is the preferred method.

Multilayer SOF's

A SOF may comprise a single layer or a plurality of layers (that is, two, three or more layers). SOFs that are comprised of a plurality of layers may be physically joined (e.g., dipole and hydrogen bond) or chemically joined. Physically attached layers are characterized by weaker interlayer interactions or adhesion; therefore physically attached layers may be susceptible to delamination from each other. Chemically attached layers are expected to have chemical bonds (e.g., covalent or ionic bonds) or have numerous physical or intermolecular (supramolecular) entanglements that strongly link adjacent layers.

Therefore, delamination of chemically attached layers is much more difficult. Chemical attachments between layers may be detected using spectroscopic methods such as focusing infrared or Raman spectroscopy, or with other methods having spatial resolution that can detect chemical species precisely at interfaces. In cases where chemical attachments between layers are different chemical species than those within the layers themselves it is possible to detect these attachments with sensitive bulk analyses such as solid-state nuclear magnetic resonance spectroscopy or by using other bulk analytical methods.

In the embodiments, the SOF may be a single layer (mono-segment thick or multi-segment thick) or multiple layers (each layer being mono-segment thick or multi-segment thick). "Thickness" refers, for example, to the smallest dimension of the film. As discussed above, in a SOF, segments are molecular units that are covalently bonded through linkers to generate the molecular framework of the film. The thickness of the film may also be defined in terms of the number of segments that is counted along that axis of the film when viewing the cross-section of the film. A "monolayer" SOF is the simplest case and refers, for example, to where a film is one segment thick. A SOF where two or more segments exist along this axis is referred to as a "multi-segment" thick SOF.

An exemplary method for preparing physically attached multilayer SOFs includes: (1) forming a base SOF layer that may be cured by a first curing cycle, and (2) forming upon the base layer a second reactive wet layer followed by a second curing cycle and, if desired, repeating the second step to form a third layer, a fourth layer and so on. The physically stacked multilayer SOFs may have thicknesses greater than about 20 Angstroms such as, for example, the following illustrative thicknesses: about 20 Angstroms to about 10 mm, such as about 1 nm to about 10 mm, or about 0.1 mm Angstroms to about 5 mm. In principle there is no limit with this process to the number of layers that may be physically stacked. Alternative examples of SOFs according to the present disclosure include free-standing films. The free-standing film thickness can be from about 1 μm to about 500 μm, or from about 10 μm to about 250 μm, or from about 100 μm to about 150 μm.

In embodiments, a multilayer SOF is formed by a method for preparing chemically attached multilayer SOFs by: (1) forming a base SOF layer having functional groups present on the surface (or dangling functional groups) from a first reactive wet layer, and (2) forming upon the base layer a second SOF layer from a second reactive wet layer that comprises molecular building blocks with functional groups capable of reacting with the dangling functional groups on the surface of the base SOF layer. In further embodiments, a capped SOF may serve as the base layer in which the functional groups present that were not suitable or complementary to participate in the specific chemical reaction to link together segments during the base layer SOF forming process may be available for reacting with the molecular building blocks of the second layer to form a chemically bonded multilayer SOF. If desired, the formulation used to form the second SOF layer should comprise molecular building blocks with functional groups capable of reacting with the functional groups from the base layer as well as additional functional groups that will allow for a third layer to be chemically attached to the second layer. The chemically stacked multilayer SOFs may have thicknesses greater than about 20 Angstroms such as, for example, the following illustrative thicknesses: about 20 Angstroms to about 10 mm, such as about 1 nm to about 10 mm, or about 0.1 mm Angstroms to about 5 mm. In principle there is no limit with this process to the number of layers that may be chemically stacked.

In embodiments, the method for preparing chemically attached multilayer SOFs comprises promoting chemical attachment of a second SOF onto an existing SOF (base layer) by using a small excess of one molecular building block (when more than one molecular building block is present) during the process used to form the SOF (base layer) whereby the functional groups present on this molecular building block will be present on the base layer surface. The surface of base layer may be treated with an agent to enhance the reactivity of the functional groups or to create an increased number of functional groups.

In an embodiment the dangling functional groups or chemical moieties present on the surface of an SOF or capped SOF may be altered to increase the propensity for covalent attachment (or, alternatively, to disfavor covalent attachment) of particular classes of molecules or individual molecules, such as SOFs, to a base layer or any additional substrate or SOF layer. For example, the surface of a base layer, such as an SOF layer, which may contain reactive dangling functional groups, may be rendered pacified through surface treatment with a capping chemical group. For example, a SOF layer having dangling hydroxyl alcohol groups may be pacified by treatment with trimethylsiylchloride thereby capping hydroxyl groups as stable trimethylsilylethers. Alternatively, the surface of base layer may be treated with a non-chemically bonding agent, such as a wax, to block reaction with dangling functional groups from subsequent layers.

Molecular Building Block Symmetry

Molecular building block symmetry relates to the positioning of functional groups (Fgs) around the periphery of the molecular building block segments. Without being bound by chemical or mathematical theory, a symmetric molecular building block is one where positioning of Fgs may be associated with the ends of a rod, vertexes of a regular geometric shape, or the vertexes of a distorted rod or distorted geometric shape. For example, the most symmetric option for molecular building blocks containing four Fgs are those whose Fgs overlay with the comers of a square or the apexes of a tetrahedron.

Use of symmetrical building blocks is practiced in embodiments of the present disclosure for two reasons: (1) the patterning of molecular building blocks may be better anticipated because the linking of regular shapes is a better understood process in reticular chemistry, and (2) the complete reaction between molecular building blocks is facilitated because for less symmetric building blocks errant conformations/orientations may be adopted which can possibly initiate numerous linking defects within SOFs.

In embodiments, a Type 1 SOF contains segments, which are not located at the edges of the SOF, that are connected by linkers to at least three other segments. For example, in embodiments the SOF comprises at least one symmetrical building block selected from the group consisting of ideal triangular building blocks, distorted triangular building blocks, ideal tetrahedral building blocks, distorted tetrahedral building blocks, ideal square building blocks, and distorted square building blocks. In embodiments, Type 2 and 3 SOF contains at least one segment type, which are not located at the edges of the SOF, that are connected by linkers to at least three other segments. For example, in embodiments the SOF comprises at least one symmetrical building block selected from the group consisting of ideal triangular building blocks, distorted triangular building blocks, ideal tetrahedral building blocks, distorted tetrahedral building blocks, ideal square building blocks, and distorted square building blocks.

Practice of Linking Chemistry

In embodiments linking chemistry may occur wherein the reaction between functional groups produces a volatile byproduct that may be largely evaporated or expunged from the SOF during or after the film forming process or wherein no byproduct is formed. Linking chemistry may be selected to achieve a SOF for applications where the presence of linking chemistry byproducts is not desired. Linking chemistry reactions may include, for example, condensation, addition/elimination, and addition reactions, such as, for example, those that produce esters, imines, ethers, carbonates, urethanes, amides, acetals, and silyl ethers.

In embodiments the linking chemistry via a reaction between function groups producing a non-volatile byproduct that largely remains incorporated within the SOF after the film forming process. Linking chemistry in embodiments may be selected to achieve a SOF for applications where the presence of linking chemistry byproducts does not impact the properties or for applications where the presence of linking chemistry byproducts may alter the properties of a SOF (such as, for example, the electroactive, hydrophobic or hydrophilic nature of the SOF). Linking chemistry reactions may include, for example, substitution, metathesis, and metal catalyzed coupling reactions, such as those that produce carbon-carbon bonds.

For all linking chemistry the ability to control the rate and extent of reaction between building blocks via the chemistry between building block functional groups is an important aspect of the present disclosure. Reasons for controlling the rate and extent of reaction may include adapting the film forming process for different coating methods and tuning the microscopic arrangement of building blocks to achieve a periodic SOF, as defined in earlier embodiments. In certain examples of forming a structured organic film as described herein, the ingredients or constituents involved in the linking chemistry can be dissolved in a bio-based solvent by simple mixing of the ingredients and allowing for the molecular building blocks, linkers, capping segments, additives, and the like to be dissolved by the solvent to form a coating solution or dispersion. In certain examples, heat, agitation, stirring, shaking, or other thermal or mechanical means may be applied to the materials to facilitate or accelerate dissolving of the ingredients to make or form a precursor solution that later form the structured organic film (SOF) upon coating the precursor solution or completed solution or coating formulation onto a substrate by spray coating, slot die coating, flow coating, spin coating, or by other coating methods known to one skilled in the art.

Innate Properties of COF's

COFs have innate properties such as high thermal stability (typically higher than 400° C. under atmospheric conditions): poor solubility in organic solvents (chemical stability), and porosity (capable of reversible guest uptake). In embodiments, SOFs may also possess these innate properties.

Added Functionality of SOF's

Added functionality denotes a property that is not inherent to conventional COFs or SOFs and may occur by the selection of molecular building blocks wherein the molecular compositions provide the added functionality in the resultant SOF. Added functionality may arise upon assembly of molecular building blocks and/or capping segments having an "inclined property" for that added functionality. Added functionality may also arise upon assembly of molecular building blocks having no "inclined property" for that added functionality but the resulting SOF has the added functionality as a consequence of linking segments(S) and linkers into a SOF. In embodiments, added functionality may also arise upon the addition and assembly of molecular building blocks and capping segments having no "inclined property" for that added functionality but the resulting SOF has the added functionality as a consequence of linking segments, linkers, and capping segments into a SOF. Furthermore, emergence of added functionality may arise from the combined effect of using molecular building blocks bearing an "inclined property" for that added functionality whose inclined property is modified or enhanced upon linking together the segments and linkers into a SOF.

An Inclined Property of a Molecular Building Block

The term "inclined property" of a molecular building block refers, for example, to a property known to exist for certain molecular compositions or a property that is reasonably identifiable by a person skilled in art upon inspection of the molecular composition of a segment. As used herein, the terms "inclined property" and "added functionality" refer to the same general property (e.g., hydrophobic, electroactive, etc.) but "inclined property" is used in the context of the molecular building block and "added functionality" is used in the context of the SOF.

The hydrophobic (superhydrophobic), hydrophilic, lipophobic (superlipophobic), lipophilic, photochromic and/or electroactive (conductor, semiconductor, charge transport material) nature of an SOF are some examples of the properties that may represent an "added functionality" of an SOP. These and other added functionalities may arise from the inclined properties of the molecular building blocks or may arise from building blocks that do not have the respective added functionality that is observed in the SOF.

The term hydrophobic (superhydrophobic) refers, for example, to the property of repelling water, or other polar species such as methanol, it also means an inability to absorb water and/or to swell as a result. Furthermore, hydrophobic implies an inability to form strong hydrogen bonds to water or other hydrogen bonding species. Hydrophobic materials are typically characterized by having water contact angles greater than 90° and superhydrophobic materials have water contact angles greater than 150° as measured using a contact angle goniometer or related device.

The term hydrophilic refers, for example, to the property of attracting, adsorbing, or absorbing water or other polar species, or a surface that is easily wetted by such species. Hydrophilic materials are typically characterized by having less than 20° water contact angle as measured using a contact angle goniometer or related device. Hydrophilicity may also be characterized by swelling of a material by water or other polar species, or a material that can diffuse or transport water, or other polar species, through itself. Hydrophilicity, is further characterized by being able to form strong or numerous hydrogen bonds to water or other hydrogen bonding species.

The term lipophobic (oleophobic) refers, for example, to the property of repelling oil or other non-polar species such as alkanes, fats, and waxes. Lipophobic materials are typically characterized by having oil contact angles greater than 90° as measured using a contact angle goniometer or related device.

The term lipophilic (oleophilic) refers, for example, to the property attracting oil or other non-polar species such as alkanes, fats, and waxes or a surface that is easily wetted by such species. Lipophilic materials are typically characterized by having a low to nil oil contact angle as measured using, for example, a contact angle goniometer. Lipophilicity can also be characterized by swelling of a material by hexane or other non-polar liquids.

The term photochromic refers, for example, to the ability to demonstrate reversible color changes when exposed to electromagnetic radiation. SOF compositions containing photochromic molecules may be prepared and demonstrate reversible color changes when exposed to electromagnetic radiation. These SOFs may have the added functionality of photochromism. The robustness of photochromic SOFs may enable their use in many applications, such as photochromic SOFs for erasable paper, and light responsive films for window tinting/shading and eyewear. SOF compositions may contain any suitable photochromic molecule, such as a difunctional photochromic molecules as SOF molecular building blocks (chemically bound into SOF structure), a monofunctional photochromic molecules as SOF capping segments (chemically bound into SOF structure, or unfunctionalized photochromic molecules in an SOF composite (not chemically bound into SOF structure). Photochromic SOFs may change color upon exposure to selected wavelengths of light and the color change may be reversible.

SOF compositions containing photochromic molecules that chemically bond to the SOF structure are exceptionally chemically and mechanically robust photochromic materials. Such photochromic SOF materials demonstrate many superior properties, such as high number of reversible color change processes, to available polymeric alternatives.

SOFs having a rough, textured, or porous surface on the sub-micron to micron scale may be hydrophobic. The rough, textured, or porous SOF surface can result from dangling functional groups present on the film surface or from the structure of the SOF. The type of pattern and degree of patterning depends on the geometry of the molecular building blocks and the linking chemistry efficiency. The feature size that leads to surface roughness or texture is from about 100 nm to about 10 μm, such as from about 500 nm to about 5 μm.

Process for Preparing an Ionic Structured Organic Film (SOF)

The process for making ionic SOFs (which may be referred to as an "SOF" below) typically comprises a similar number of activities or steps (including, but not limited to those set forth below) that are used to make a non-ionic SOF. The ionic segment may be added during either step a, b or c depending the desired distribution of the ionic segment in the resulting SOF. For example, if it is desired that the ionic segment distribution is substantially uniform over the resulting SOF, the ionic segment may be added during step a. Alternatively, if, for example, a more heterogeneous distribution of the ionic segment is desired, adding the ionic segment (such as by spraying it on the film formed during step b or during the promotion step of step c) may occur during steps b and c. Alternatively, the ionic segment may be innately ionic, or can be subjected to an additional post-processing step, e.g., after step c) to add or react with a capping segment or molecular building block to provide an ionic group.

The process for making SOFs typically comprises a number of activities or steps (set forth below) that may be performed in any suitable sequence or where two or more activities are performed simultaneously or in close proximity in time:

A process for preparing a structured organic film comprising:

(a) preparing a liquid-containing reaction mixture comprising a plurality of molecular building blocks each comprising a segment and a number of functional groups. Optionally, one or more pre-linkers, catalysts, additives, or building blocks corresponding to building block segments, capping segments, ionic capping segments, ionic building block segments, or combinations thereof may be incorporated into the reaction mixture by dissolution or dispersion;
(b) depositing the reaction mixture as a wet film;
(c) promoting a change of the wet film including the molecular building blocks to a dry film comprising the SOF comprising a plurality of the segments and a plurality of linkers arranged as a covalent organic framework, wherein at a macroscopic level the covalent organic framework is a film;
(d) optionally removing the SOF from the coating substrate to obtain a free-standing SOF;
(e) optionally processing the free-standing SOF into a roll;
(f) optionally cutting and seaming the SOF into a belt; and
(g) optionally performing the above SOF formation process(es) upon an SOF (which was prepared by the above SOF formation process(es)) as a substrate for subsequent SOF formation process(es).

The above activities or steps may be supplemented by procedures described herein in the present disclosure or in specific examples. The above activities or steps may be conducted at atmospheric, super atmospheric, or subatmospheric pressure. The term "atmospheric pressure" as used herein refers to a pressure of about 760 torr. The term super atmospheric, refers to pressures greater than atmospheric pressure, but less than 20 atm. The term "subatmospheric pressure" refers to pressures less than atmospheric pressure. In an embodiment, the activities or steps may be conducted at or near atmospheric pressure. Generally, pressures of from about 0.1 atm to about 2 atm, such as from about 0.5 atm to about 1.5 atm, or 0.8 atm to about 1.2 atm may be conveniently employed. Further considerations related to the aforementioned process steps or processes for preparing or fabricating SOFs are detailed in U.S. Pat. Nos. 8,093,347; 8,436,130; 8,357,432; 8,394,495; 8,389,060; 8,318,892; and 9,097,995, the disclosures of which are totally incorporated herein by reference in their entireties.

Examples of the present disclosure include various CEM-type, AEM-type, or both SOFs which have been made to evaluate the ion exchange capacity (IEC) of these materials. The IEC is a parameter that provides the number of cationic groups for AEMs or the number of anionic groups for CEMs based on number of equivalents (frequently milliequivalents) per gram of dry membrane. IEC is an ion-exchange capacity, also referred to as a charge per mass of polymer expressed either in milliequivalents of charge per gram of polymer, meq/g. In certain examples, a doubly charged ion within the polymer has twice the equivalents of charge as compared to a singly charged ion.

As described herein, a variety of ionic molecules, or ionic molecule precursors, that can be used as molecular building blocks or capping groups can be combined with one or more piperidinium and pyridinium based quaternary ammonium segments, and others, as described previously. The reaction mechanisms employed in the examples are based on the formation of ether linkages (transetherification) but the reaction linkages can be extended to B—O (boroxine, boronate ester, spiroborate, and borosilicate), C═N (imine, hydrazone, and squaraine), C—N (β-ketoenamine, imide, and amide), in other examples. Examples of the present disclosure include ionic segments added to SOFs based on molar equivalents. A molar equivalent is a ratio of moles of an ionic segment, to moles of a non-ionic segment or molecular building block, such as THM-TBD. In certain examples, including, but not limited to the ones recited herein, the ionic segment or other ionic component may alternatively be present in an SOF formulation without a counterion, for example, bromide. The SOF film provided may not include the counterion as formed, and therefore may have an ionic character imparted after fabrication via reaction or other means. This ratio or concentration of ionic segments to nonionic segments can be from about 0.5, to about 10.0, or from about 1.0 to about 5.0, or from about 1.0 to about 2.5, based on a total concentration of segments in the SOF. This ratio or concentration of ionic segments to nonionic segments can be from about 0.5, to about 10.0, or from about 1.0 to about 5.0, or from about 1.0 to about 2.5. Molar equivalents of ionic segments as compared to non-ionic segments, or nonionic segments, can also be from about 0.5, to about 10.0, or from about 1.0 to about 5.0, or from about 1.0 to about 2.5. The upper limit of ionic segments depends on the number of reactive functional group sites on a given nonionic molecular building block segment, as well as on the ionic segment. It should not exceed n−2, where n is the number of reactive functional groups on a molecular building block segment, otherwise a linear polymer or small molecules can form. In examples described herein, it is not desirable to form crosslinked or large chained polymers as compared to the formation of an SOF network.

The present disclosure provides the addition of a polymer into an SOF network for the purpose of providing enhanced or additional physical integrity to a normally brittle SOF network. During fabrication of the SOF network, polyethersulfone or another polymer additive, which is soluble in the system, can be added during the formulation. Unlike certain polymer blends, where all ingredients are homogenously blended, the formulations and resultant networks of the include discrete nanodomains. These nanodomains can be a single or plurality of nanometer-sized cluster or clusters of a polymer found within a bulk matrix of an SOF network film or polymer. Under a magnified observation each nanodomain can range from about 50 nm to about 100 nm, or from about 50 nm to about 1 micron. These nanodomain-containing formulations or resultant SOF films can also be considered a solid dispersion or suspension after formation and processing. A nanometer scale cluster of an additive material in a SOF matrix can have a scale of the additive up to 1 micron, including from about 50 nm to about 1000 nm, or from about 250 nm to about 1000 nm, or from about 250 nm to about 500 nm.

The polymer additive-reinforced SOF network is formed by physical association of two compositions, while still maintaining certain properties of both the nanodomain material as well as the surrounding matrix material composition. While certain polymers can fall out or "crash out" of the SOF formulation solution, polysulfones or polyethersulfones, such as but not limited to poly(oxy-1,4-phenylenesulfonyl-1,4-phenylene) can be successfully incorporated into the SOF network. While the polymer additive does not chemically participate in the SOF network, the polymer additive adds support or physical reinforcement to the SOF network, providing improved mechanical robustness. This further allows loading of higher amounts of ionic segments (molecular building block segments) or ionic capping segments (ionic capping groups), which are normally limited in quantity within an SOF formulation due to the additional brittleness that usually accompanies increased loadings of these ionic building block segments or ionic capping group segments. Polysulfone can refer to a polymer having a polysulfone repeat unit, while polyethersulfone can refer to a polymer having a polyethersulfone repeat unit, either of which can be applicable materials within composite films of the present teachings. Polysulfone sometimes refers to a polymer having a dimethyl group in the repeating unit whereas the polyethersulfone may not, although in some examples, this may not be the case. Additional examples include poly[oxy-1,4-phenylensulfonyl-1,4-phenylenoxy-1,4-phenylen(1-methylethyliden)-1,4-phenylen], poly(oxy-1,4-phenylsulfonyl-1,4-phenyl), polyphenylenesulfone (PPSU), Victrex HTA™, poly(arylene sulfone) (PAS), or combinations thereof.

The present teachings therefore provide structured organic films (SOF), including an SOF network, which includes a plurality of segments, a plurality of linkers, wherein at least one of the plurality of linkers connects at least one of the plurality of segments, and a polymer additive incorporated into the SOF network. In examples, the polymer additive is present in the SOF in a plurality of nanodomains. Examples of polymer additives can include polyethersulfones, such as poly(oxy-1,4-phenylenesulfonyl-1,4-phenylene), as well as others mentioned herein. In examples, the polymer additive is present in an amount of from about 5 wt % to about 25 wt % based on a total weight of the SOF. Further examples ionic segments, ionic capping segments, or combinations thereof. In examples, a thickness of the SOF is from about 250 nm to about 500 μm, with an ion exchange capacity (IEC) of from about 0.25 mEq/g to about 5.00 mEq/g, or an electrical conductivity of from about 15 mS/cm to about 50 mS/cm. These SOFs can be used as ion-exchange membranes as free-standing films. In examples, the SOF networks can include where at least one or more of the plurality of segments comprises an ionic species, and at least one or more of the plurality of segments comprises a nonionic species. It should be noted that based on the polarity of polyethersulfones (PES) when dissolved in DMSO, similar polymers to PES should have a similar effect. Examples can include other polysulfones and polyether sulfones as noted previously. Certain polymer additives that do not form effective SOF films similar to those provided by the present disclosure include polystyrene and derivatives, polyamides, polyvinylidene fluoride (PVDF). In addition, polymers such as polyvinyl alcohol (PVA) dissolved but did not improve physical properties, making the resulting more brittle.

EXAMPLES

Comparative Example 1: SOF-AEM Containing NHM4PipMBr with no polymer additive reinforcement. THM-TBD (7.93 g, 13.0 mmol) and NHM4PipMBr (6.62 g, 26.0 mmol) were dissolved in a mixture of 3 g DMSO and 12 g DMF. The solution was sonicated for 20 min to ensure dissolution. After the sonication of the THM-TBD solution, the pTSA catalyst (0.45 g, 2.6 mmol) was then added to vial and shaken until fully dissolved.

TABLE 1

Formulation of Comparative Example 1; SOF-AEM Ink containing NHM4PipMBr.

| Desired Component: | Role | Linking Sites | % Active Component | Ratio/ Stoichio-metry | wt % of Solids | Total Mass (g) |
|---|---|---|---|---|---|---|
| NHM4PipMBr | Building Block | 2 | 100 | 2 | 44.14 | 6.621 |
| THM-TBD | Building Block | 4 | 100 | 1 | 52.86 | 7.929 |
| pTSA monohydrate | Catalyst | | 100 | | 3.00 | 0.45 |
| Dimethyl sulfoxide (DMSO) | Solvent | | | 0.2 | | 3.0 |
| Dimethylformamide (DMF) | Solvent | | | 0.8 | | 12.0 |

Comparative Example 2: SOF-AEM Containing NPM4PipMBr with no polymer additive reinforcement. Same procedure as Comparative Example 1 was following in accordance with the formula shown in Table 2.

TABLE 2

Formulation of Comparative Example 2; SOF-AEM Ink containing NHM4PipMBr.

| Desired Component: | Role | Linking Sites | % Active Component | Ratio/ Stoichio-metry | wt % of Solids | Total Mass (g) |
|---|---|---|---|---|---|---|
| NPM4PipMBr | Building Block | 2 | 100 | 2 | 46.37 | 3.153 |
| THM-TBD | Building Block | 4 | 100 | 1 | 52.63 | 3.579 |
| pTSA monohydrate | Catalyst | | 100 | | 1.00 | 0.068 |
| Dimethyl sulfoxide (DMSO) | Solvent | | | 0.8 | | 8.16 |
| Dimethylformamode (DMF) | | | | 0.2 | | 2.04 |

Comparative Example 3: PiperIon 15 commercial AEM. Versogen™'s 15 micrometers thick mechanically reinforced anion exchange membrane sheets are currently offered in 5×5 cm, and 10×10 cm sizes. PiperION mechanically reinforced AEMs are manufactured from the functionalized poly(aryl piperidinium) resin material and microporous ePTFE reinforcement in order to yield an AEM with excellent mechanical durability and reduced overall swelling or minimal physical dimension change.

Comparative Example 4: Sustainion X37-50, commercial AEM. Sustainion® Anion Exchange Membrane has a dry thickness at above 50 microns. They are moderately basic and designed for use with supporting electrolyte. Dioxide Materials has optimized them for use in alkaline water electrolyzers and in $CO_2$ electrolyzers.

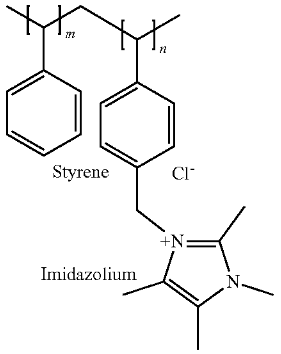

EXAMPLES

Control—SOF Synthesized from THM-TBD Building Block with No Charged Species: Dowanol PM (1-methoxy-2-propanol, 9.0190 g), Nacure 5225 (0.0127, 0.25 wt. %), Silclean 3700 (0.0501, 1.0 wt. %) and THM-TBD (0.9878 g, 98.75 wt. %) were added to a 4-dram vial in the stated order. The vial was placed in a block heater and heated at 65° C. for 90 minutes. Three grams of solution was then cured at 120° C. for 40 minutes in an aluminum pan. The IEC value of this film was 0 mEq/g (as measured by manual titration), as expected due to an absence of charged groups.

Ionic Building Blocks Used in the Examples

N-hydroxyethylmethyl-4-piperidiniummethanol bromide (NHM4PipMBr)

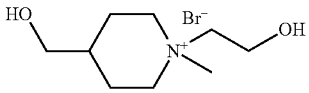

N-hydroxypropylmethyl-4-piperidiniummethanol bromide (NPM4PipMBr)

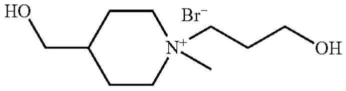

Polymer Additive used in the Examples: Poly(ether sulfone) Sigma Aldrich (191094): Poly(oxy-1,4-phenylene-sulfonyl-1,4-phenylene)

Example 1—NHM4PipMBr THM-TBD Film Reinforced with 5% PES; Weight % of solids taking into account stoichiometry. 10% (w/w in DMSO) poly(oxy-1,4-phenylenesulfonyl-1,4-phenylene) solution (0.8 g) was added to a vial followed by remaining DMSO (1.2 g) and DMF (0.48 g). The THM-TBD (0.800 g, 1.31 mmol) was added to the vial and sonicated for 5 minutes until fully dissolved. Next, the NHM4PipMBr (0.704 g, 2.77 mmol) was added and sonicated for 30 minutes until fully dissolved. After the sonication of the THM-TBD solution, the pTSA catalyst (0.016 g, 0.09 mmol) was then added to vial and shaken until fully dissolved.

TABLE 3

Formulation of Example 1; SOF-AEM containing 5% PES, 2 eq.NHM4PipMBr.

| Desired Component: | Role | Linking Sites | % Active Component | Ratio/ Stoichio- metry | wt % of Solids | Total Mass (g) |
|---|---|---|---|---|---|---|
| NHM4PipMBr | Building Block | 1 | 100 | 2.1 | 44.03 | 0.704 |
| THM-TBD | Building Block | 4 | 100 | 1 | 49.97 | 0.800 |
| Poly(oxy-1,4-phenylenesulfonyl-1,4-phenylene) | Additive | | 100 | | 5.00 | 0.08 |
| pTSA monohydrate | Catalyst | | 100 | | 1.00 | 0.016 |
| Dimethyl sulfoxide (DMSO) | Solvent | | | 0.8 | | 1.92 |
| Dimethylformamode (DMF) | | | | 0.2 | | 0.48 |

Example 2—NPM4PipMBr THM-TBD Film Reinforced with 5% PES; Weight % of solids taking into account stoichiometry. Same formulation procedure as Example 1.

TABLE 4

Formulation of SOF-AEM Ink containing 5% PES, 2 eq. NPM4PipMBr.

| Desired Component: | Role | Linking Sites | % Active Component | Ratio/ Stoichio- metry | wt % of Solids | Total Mass (g) |
|---|---|---|---|---|---|---|
| NPM4PipMBr | Building Block | 1 | 100 | 2 | 44.03 | 0.705 |
| THM-TBD | Building Block | 4 | 100 | 1 | 49.97 | 0.800 |
| Poly(oxy-1,4-phenylenesulfonyl-1,4-phenylene) | Additive | | 100 | 5% | 5.00 | 0.080 |
| pTSA monohydrate | Catalyst | | 100 | 1% | 1.00 | 0.016 |
| Dimethyl sulfoxide (DMSO) | Solvent | | | 0.8 | | 1.92 |
| Dimethylformamode (DMF) | Solvent | | | 0.2 | | 0.48 |

Example 3—NPM4PipMBr THM-TBD Film Reinforced with 10% PES; Weight % of solids taking into account stoichiometry. Same formulation procedure as Example 1.

TABLE 5

Formulation of Example 3; SOF-AEM Ink containing 10% PES, 2 eq. NPM4PipMBr.

| Desired Component: | Role | Linking Sites | % Active Component | Ratio/ Stoichio- metry | wt % of Solids | Total Mass (g) |
|---|---|---|---|---|---|---|
| NPM4PipMBr | Building Block | 1 | 100 | 2 | 41.69 | 0.667 |
| THM-TBD | Building Block | 4 | 100 | 1 | 47.31 | 0.757 |
| Poly(oxy-1,4-phenylenesulfonyl-1,4-phenylene) | Additive | | | | 10.00 | 0.16 |
| pTSA monohydrate | Catalyst | | 100 | | 1.00 | 0.016 |
| Dimethyl sulfoxide (DMSO) | Solvent | | | 0.8 | | 1.92 |
| Dimethylformamode (DMF) | Solvent | | | 0.2 | | 0.48 |

Example 4—NPM4PipMBr THM-TBD Film Reinforced with 2.5% PES; Weight % of solids taking into account stoichiometry. Same formulation procedure as Example 1.

TABLE 6

Formulation of Example 4; SOF-AEM Ink containing 2.5% PES, 2 eq. NPM4PipMBr.

| Desired Component: | Role | Linking Sites | % Active Component | Ratio/ Stoichio-metry | wt % of Solids | Total Mass (g) |
|---|---|---|---|---|---|---|
| NPM4PipMBr | Building Block | 1 | 100 | 2 | 45.20 | 0.7232 |
| THM-TBD | Building Block | 4 | 100 | 1 | 51.30 | 0.8208 |
| Poly(oxy-1,4-phenylenesulfonyl-1,4-phenylene) | Additive | | 100 | | 2.5 | 0.040 |
| pTSA monohydrate | Catalyst | | 100 | | 1.00 | 0.016 |
| Dimethyl sulfoxide (DMSO) | Solvent | | | 0.8 | | 1.92 |
| Dimethylformamode (DMF) | Solvent | | | 0.2 | | 0.48 |

Example 5—NPM4PipMBr (2.5 Eq.) THM-TBD Film Reinforced with 5% PES; Weight % of solids taking into account stoichiometry. Same formulation procedure as Example 1.

TABLE 7

Formulation of Example 5; SOF-AEM Ink containing 5% PES, 2.5 eq. NPM4PipMBr.

| Desired Component: | Role | Linking Sites | % Active Component | Ratio/ Stoichio-metry | wt % of Solids | Total Mass (g) |
|---|---|---|---|---|---|---|
| NPM4PipMBr | Building Block | 1 | 100 | 2.5 | 49.27 | 0.7883 |
| THM-TBD | Building Block | 4 | 100 | 1 | 44.73 | 0.7157 |
| Poly(oxy-1,4-phenylenesulfonyl-1,4-phenylene) | Additive | | 100 | | 5.00 | 0.080 |
| pTSA monohydrate | Catalyst | | 100 | | 1.00 | 0.016 |
| Dimethyl sulfoxide (DMSO) | Solvent | | | 0.8 | | 1.92 |
| Dimethylformamode (DMF) | Solvent | | | 0.2 | | 0.48 |

The reaction scheme below shows the reaction that occurs during the curing process of the SOF formulations described herein. Upon addition of an acid catalyst and exposure to heat, the building block and capping group undergo a condensation reaction to produce an ether-linked cationic network.

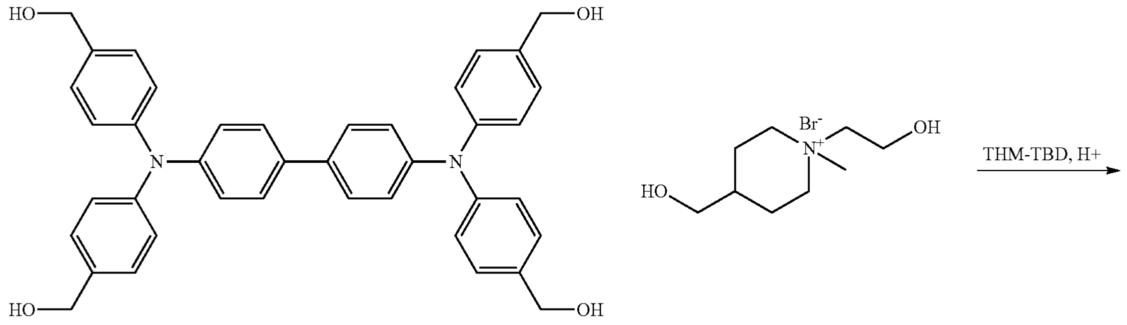

-continued

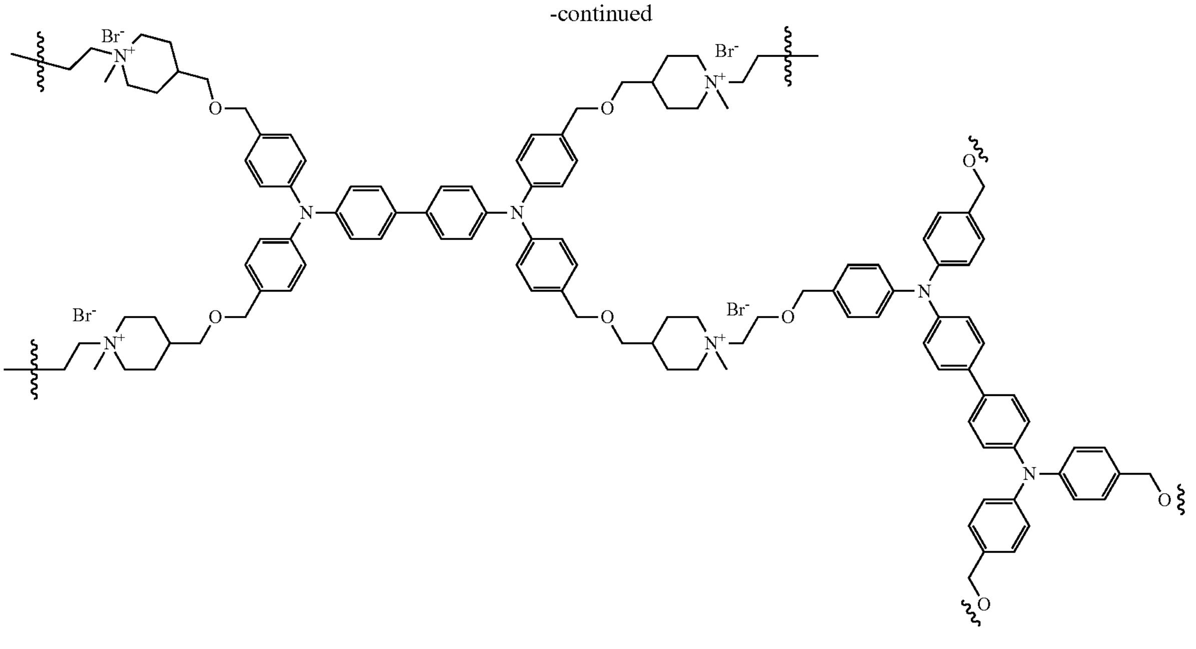

Free-Film flexibility was subjectively evaluated using draw down coated thin (<10 μm) free film made with 5% PES reinforcement. It was noted that previously fabricated SOF-AEM membranes made with the NPM4PipMBr ionic building block were fairly robust and could be coated, handled and tested at about 25 μm. Below this thickness, the films became very fragile. With the inclusion of poly(oxy-1,4-phenylenesulfonyl-1,4-phenylene) the films can be coated below 10 μm while still maintaining mechanical strength. In addition, adding more than 2 eq. of the ionic building block in the absence of polymer reinforcement resulted in very fragile films regardless of thickness in previous experimentation. With the reinforcement of the polymer additives of the present disclosure, the ionic content can be increased, increasing IEC and conductivity, while retaining a robust film, such as determined with Example 5. The addition of the compatible polymer additive to the SOF formulation drastically increases the viscosity of the coating formulations resulting in less crating, pin holes, edge pull-back and therefore more uniform, more defect-free films.

Alkaline Stability: Piperidinium cations show very good stability in alkaline conditions. Comparative Example 1 retained 88.5% of the IEC value after 750 hours in 1M KOH at room temperature. Comparative Example 2 retained 99% of the IEC value after 600 hours in 2M KOH at 80° C. In contrast, Comparative Example 3, including a NEtTMImBr building block segment, degraded after 60 hours subjected to 1M KOH solution. Poly(ethersulfone) is extremely robust to alkaline conditions. In addition, it is stable above 200° C., which allows for the high SOF curing temperatures (>150° C.). The N-cyclic quaternary ammonium compounds used herein also show extremely high stability in comparison to the alkyl counterparts, such as at accelerated conditions like 160° C. and 6M NaOH, which is well above any E-cell operating conditions.

Ion Exchange Capacity: All samples in Table 8 were measured for IEC using a titration method. The IEC of SOF-AEM films containing 2.5-10% poly(oxy-1,4-phenylenesulfonyl-1,4-phenylene) (1.54, 1.46, 1.43 meq/g respectively) were as high as samples without (1.29-1.4 meq/g). In addition, the IEC for the polymer reinforced material was as great or higher than the commercially available membranes Sustanion and PiperIon. This shows that the addition of PES to the SOF-AEM does not have a negative effect on the IEC of the material but merely decreases slightly as the polymer increases due to there being less slightly ionic building block present.

TABLE 8

Ion exchange capacities of SOF films containing PES.

| EXP # | Ionic BB Segment | Ionic BB Ratio | IEC (meq/g) | Polymer Loading (%) |
|---|---|---|---|---|
| Comparative Example 1 | NHM4PipMBr | 2 | 1.29 | 0 |
| Comparative Example 2 | NPM4PipMBr | 2 | 1.40 | 0 |
| Comparative Example 4- PiperIon 15 (Commercial) | N,N-dimethylpiperidinium | N/A | 1.5 | 0 |
| Comparative Example 5-Sustanion X37-50 (Commercial) | Tetramehtylimidazolium | N/A | 1.2-1.4 | 0 |
| Example 1 | NHM4PipMBr | 2 | 1.46 | 5 |
| Example 3 | NPM4PipMBr | 2 | 1.43 | 10 |
| Example 4 | NPM4PipMBr | 2 | 1.54 | 2.5 |
| Example 5 | NPM4PipMBr | 2.5 | TBD | 5 |

In-Plane Conductivity: Samples were coated by draw down with coating rods. #24 and #44 wire gauge rods were used. In-plane ionic conductivity was measured for the free-films containing the NHM4PipMBr building block. Free-films were cut into 1×3 cm strips and soaked in 1M KOH overnight to prep for the conductivity test. Conductivity with 5% PES incorporation (Examples 1 and 2) was very consistent with that seen from SOF-AEMs containing no polymer (Comp. Examples 1 and 2). With 2.5% polymer loading, the conductivity was as high as 18.3 mS/cm which is the highest seen for these SOF-AEM materials. When a thinner sample (10 μm vs 15 μm) with 2.5% polymer loading was tested the conductivity recorded was lower but still in the range of previous polymer free samples. This may be due to contact in the conductivity instrument as contact with very thin films may be lower. This effect has also been seen with commercial membranes. This is the thinnest sample that has been tested for conductivity as samples without the polymer reinforcement will tear. Example 3, with 10% PES loading shows a drop in conductivity, which may point to a limit where the polymer starts effecting the ionic network. When the ionic building block (NPM4PipMBr) loading is increased to 2.5 eq., the conductivity increased by 46% (Ex. 5 vs Ex. 2). Increasing the ionic content and therefore the IEC and ionic conductivity of the SOF-AEM films should lead to increased activity in the $CO_2$RR (carbon dioxide reduction reaction) flow cell. This increase in ionic character is only possible because of the polymer reinforcement. Commercial membranes still have higher conductivity during our early development, however, due to the ultrathin nature of the SOF-AEMs, comparable or lower resistivity (p=RA/1) would be observed once in an electrochemical cell.

TABLE 9

In-plane conductivity of SOF-AEM films.

| EXP # | Ionic Building Block | Ionic Building Block Equivalents | In-Plane Conductivity (1M KOH Soak) (mS/cm) | Avg. Thickness (um) | Polymer Loading (%) |
|---|---|---|---|---|---|
| Comparative Example 1 - EXP-22-AC3108 | NHM4PipMBr | 2 | 11.2 ± 0.3 | 29.2 ± 2.2 | 0 |
| Comparative Example 2 - EXP-23-AC3127 | NPM4PipMBr | 2 | 14.7 ± 1.3 | 59.9 ± 19.0 | 0 |
| Comparative Example 3-PiperIon 15 | N,N-dimethylpiperidinium | N/A | 23.4 ± 13.7 | 17.8 ± 2.7 | 0 |
| Comparative Example 4 - Sustainion X37-50 | Tetramehtylimidazolium | N/A | 47.5 ± 6.9 | 45.3 ± 1.7 | 0 |
| Example 1-EXP-23-AC3129 #44 | NHM4PipMBr | 2 | 10.9 ± 1.6 | 25.4 ± 7.6 | 5 |
| Example 2-EXP-23-AC3129-2 #44 | NPM4PipMBr | 2 | 10.8 ± 0.5 | 28.7 ± 0.9 | 5 |
| Example 4-EXP-23-AC3131-2 #44 | NPM4PipMBr | 2 | 18.3 ± 4.1 | 14.9 ± 1.6 | 2.5 |
| Example 4-EXP-23-AC3131-2 #24 | NPM4PipMBr | 2 | 10.9 ± 2.7 | 10.1 ± 2.0 | 2.5 |
| Example 3 - EXP-23-AC3131-1 #44 | NPM4PipMBr | 2 | 6.9 ± 0.9 | 19.4 ± 2.3 | 10 |
| Example 5 - EXP-23-AC3135 | NPM4PipMBr | 2.5 | 15.9 ± 1.5 | 21.3 ± 0.8 | 5 |

Figure 2:
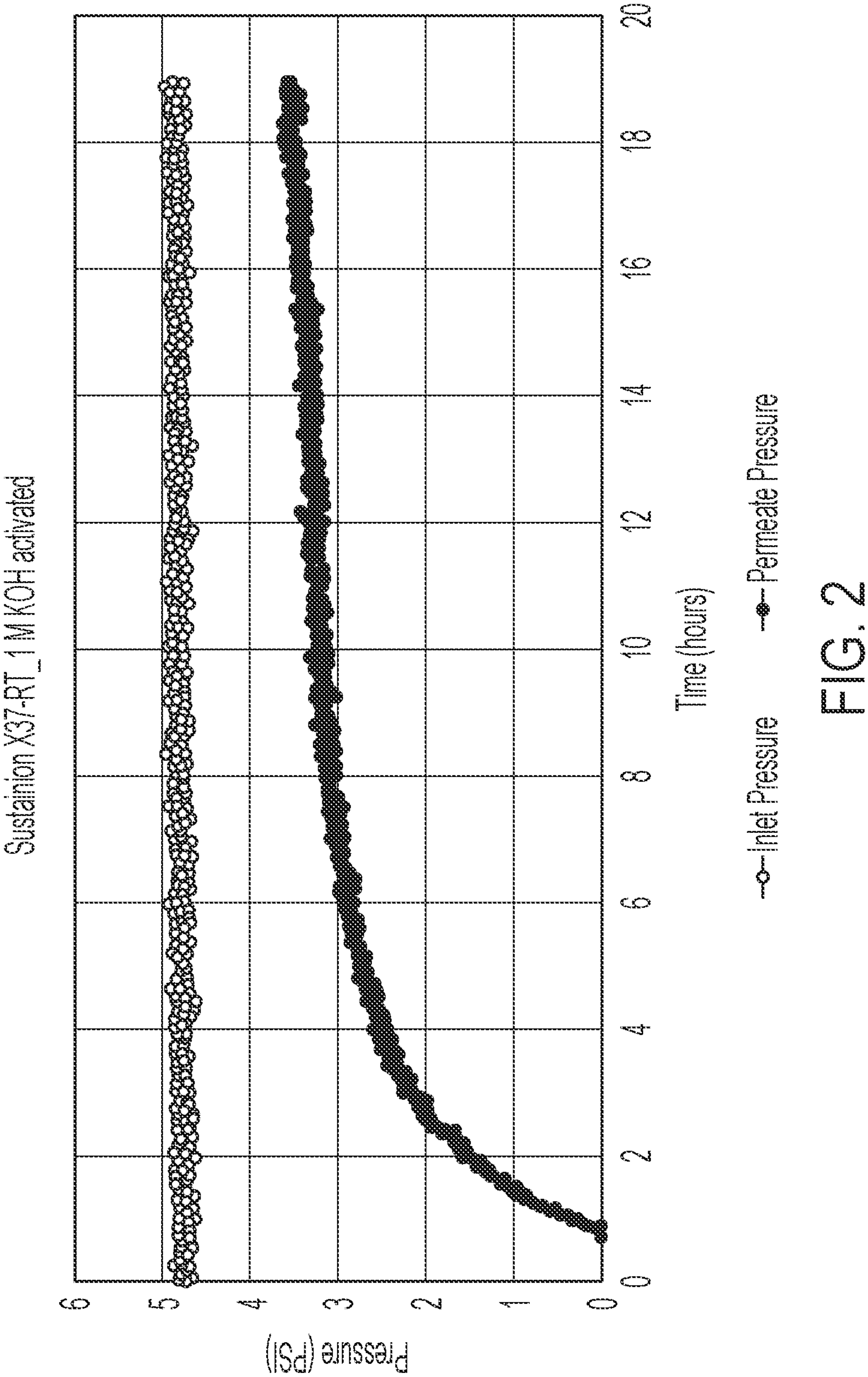
FIG. 2 is a plot depicting gas permeability ($CO_2$) of a Sustanion® membrane (comparative example 4) having a film thickness of 45.3 μm±1.7 μm at 5 psi, in accordance with the present disclosure.
Figure 3:
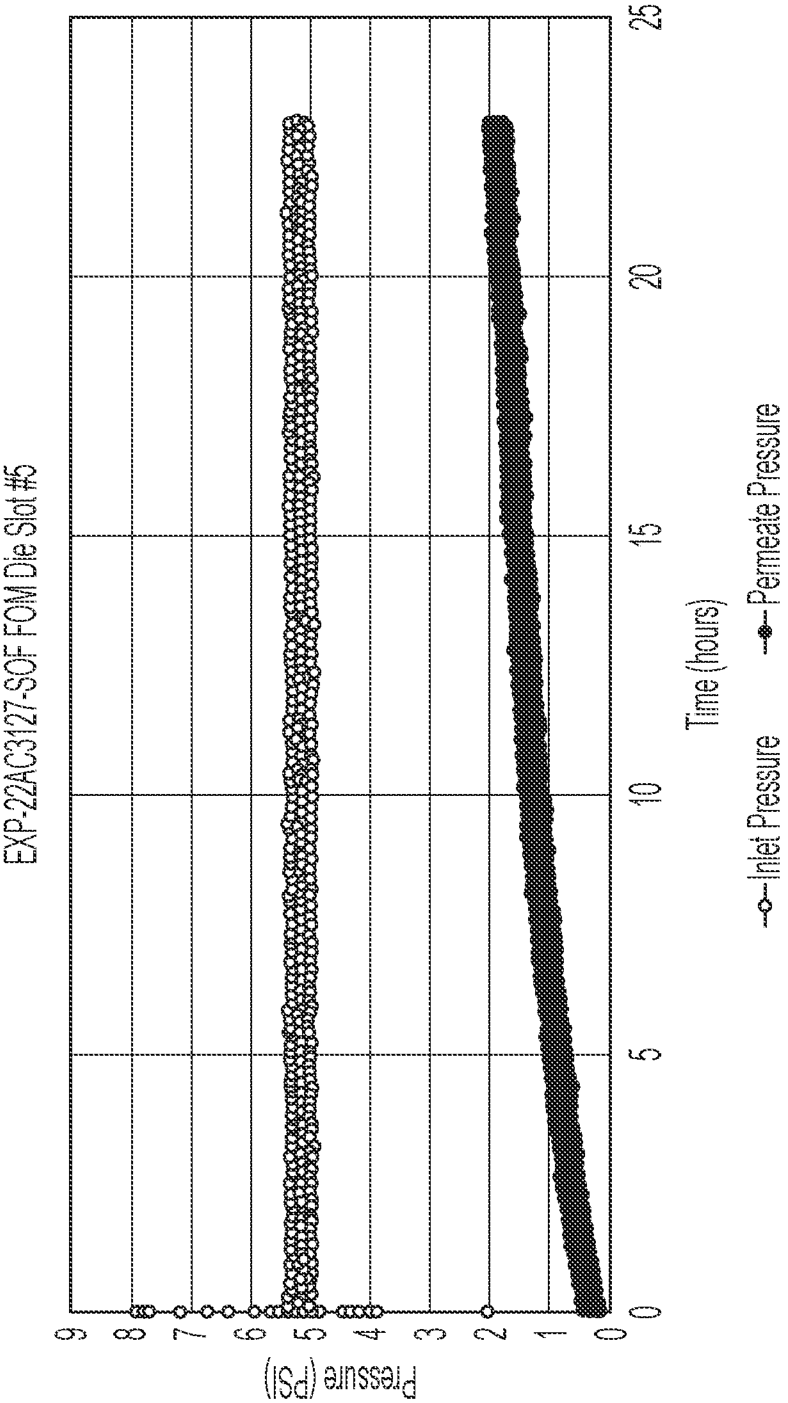
FIG. 3 is a plot depicting gas permeability ($CO_2$) of example 2 having a film thickness of 27.9 μm±6.3 μm at 5 psi, (FIG. 5) in accordance with the present disclosure.
Figure 4:
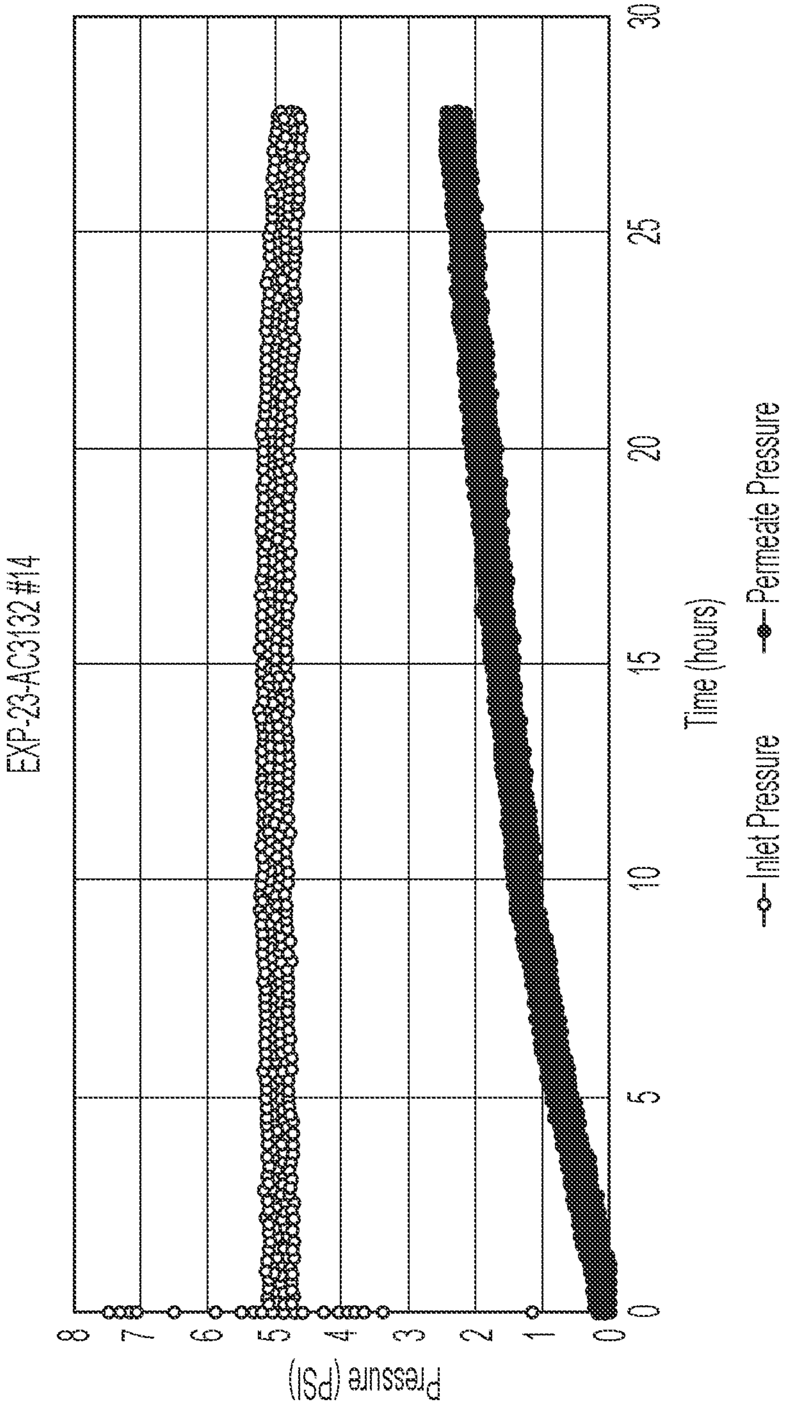
FIG. 4 is a plot depicting gas permeability ($CO_2$) of counter Example 6 (same formulation as Example 2, 5% PES), having a film thickness of 7.5 μm #1.1 μm at 5 psi, in accordance with the present disclosure.

Gas Permeability: FIG. 2 is a plot depicting gas permeability ($CO_2$) of a Sustanion® membrane (Comparative Example 4) having a film thickness of 45.3 μm±1.7 μm at 5 psi, in accordance with the present disclosure. FIG. 3 is a plot depicting gas permeability ($CO_2$) of Example 2 having a film thickness of 27.9 μm±6.3 μm at 5 psi, in accordance with the present disclosure. FIG. 4 is a plot depicting gas permeability ($CO_2$) of counter Example 6 (same formulation as Example 2, 5% PES), having a film thickness of 7.5 μm±1.1 μm at 5 psi, in accordance with the present disclosure. Gas permeability of $CO_2$ for the SOF-AEM with 5% AEM is almost identical to that of counter Example 2 which is almost 4× thicker (7.5 μm vs. 27.9 μm). Previously made films this thin have not been able to be tested due to fragility when handling and testing. The reinforced films hold $CO_2$ much better than commercial material Sustanion.

Figure 5A:
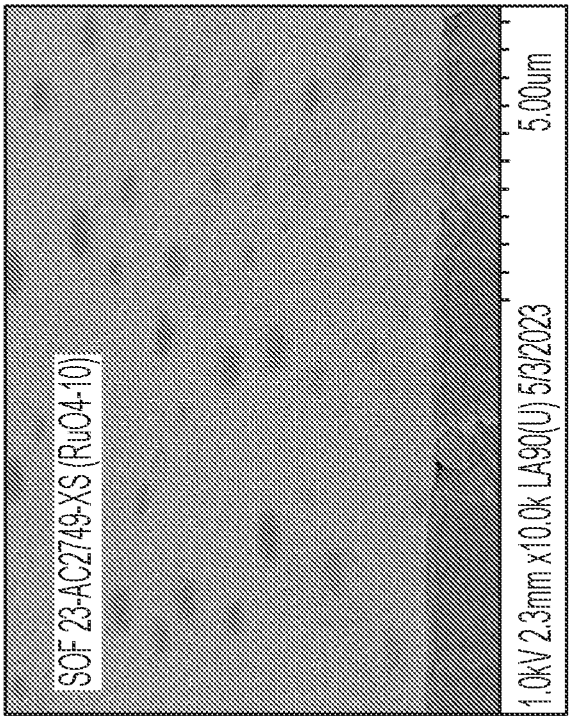
FIGS. 5A-5C are cross-sectional scanning electron microscope images of an exemplary SOF film, in accordance with the present disclosure.
Figure 5B:
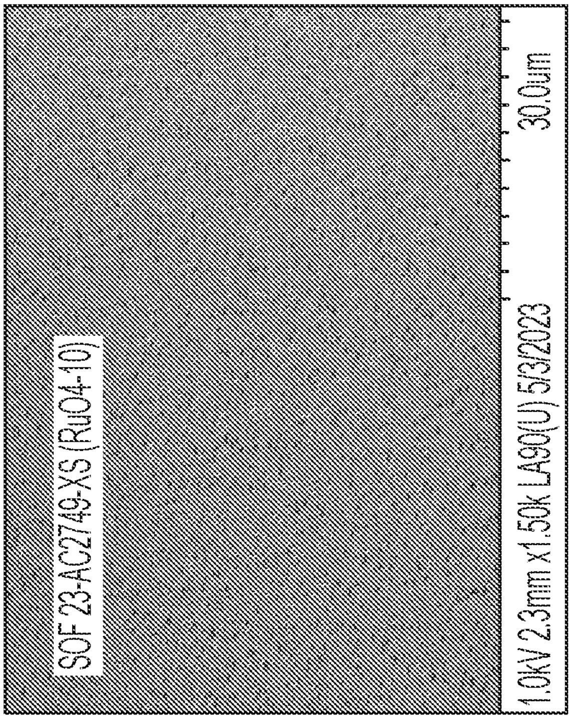
Figure 5C:
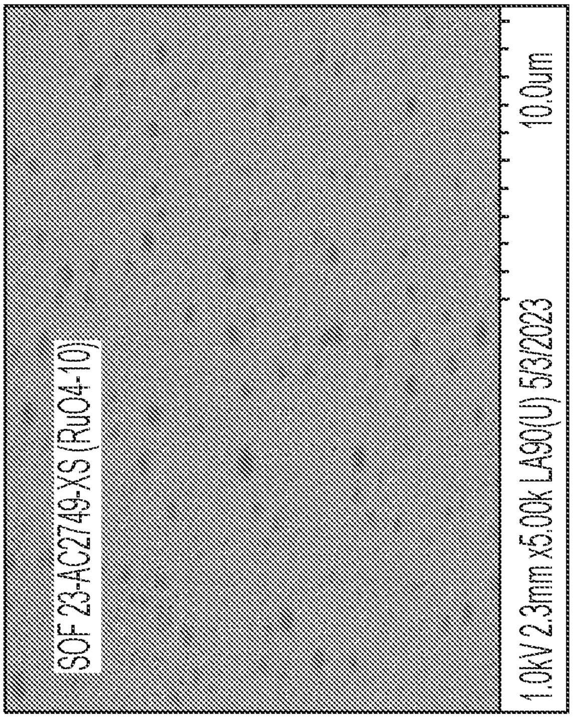

FIGS. 5A-5C are cross-sectional scanning electron microscope images of an exemplary SOF film, in accordance with the present disclosure. SEM cross sectional (cryo-cut) images of 2:1 NPM4PipMBr:THM-TBD, 40% solids, 80:20 DMSO/DMF, 1% pTSA, 0.4% Tego Twin 4200, 5% PES are shown at different magnifications, where the PES nanodomains present as dark spots in the images of FIGS. 5A-5C. Each film was vapour stained with $RuO_4$. The dark domains represent PES which does not take up the $RuO_4$ stain as richly as does the SOF. The SOF readily takes up the stain allowing for good contrast between the SOF and the PES nanodomain areas. The PES domains are well-distributed throughout the film.

Flow Cell Performance: A formulation equivalent to Example 2 was coated to ~10 μm thickness. This membrane was activated for 48 hours in 1M KOH and then assembled in a flow cell for $CO_2$RR. The membrane facilitated $CO_2$ reduction of 5.62% and 13.06% at 3.0 V and 3.6 V, respectively, with current densities of 65.7 mA/cm$^2$ and 173.0 mA/cm$^2$, respectively. This performance should be pushed even higher as ionic content of the membranes is increased, such as towards from about 20 to about 30% $CO_2$ reduction and current density above 200 mA/cm$^2$.

Additional polymer additives useful in SOF film examples of the present disclosure can include polysulfones including poly[oxy-1,4-phenylenesulfonyl-1,4-phenylene-oxy-1,4-phenylene (1-methylethylidene)-1,4-phenylene], 4,4'-Dichlorodiphenyl sulfone-p-hydroquinone copolymer, and others.

Molecular weight ranges of polymer additives can range from about 1K to about 50K, or from about 5K to about 35K, or from about 10K to about 25K.

TABLE 10

Formulation with 3 eq. NPM4PipMBr exhibiting in-plane conductivity of 83.62 mS/cm

| Desired : Component | Role | Linking Sites | % Active Component | Ratio/ Stoichio-metry | wt % of Solids | Desired Total Mass (g) |
|---|---|---|---|---|---|---|
| N-hydroxypropylmethyl-4-piperidiniummethanol bromide | Building Block | 2 | 100 | 3 | 52.94 | 1.0589 |
| THM-TBD | Building Block | 4 | 100 | 1 | 40.06 | 0.8011 |
| pTSA monohydrate | Catalyst | | 100 | | 1.00 | 0.0200 |
| Tego Twin 4200 | Additive | | 100 | | 1.00 | 0.0200 |
| Polyethersulfone | Additive | | 100 | | 5.00 | 0.1000 |
| Dimethylsulfoxide (DMSO) | Solvent | | | 0.8 | | 2.4000 |
| DMF | Solvent | | | 0.2 | | 0.6000 |

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A structured organic film (SOF) composite, comprising:
- a structured organic film (SOF), comprising:
  - a plurality of segments;
  - a plurality of linkers, wherein at least one of the plurality of linkers connects at least one of the plurality of segments; and
  - a polymer additive comprising poly(oxy-1,4-phenylenesulfonyl-1,4-phenylene) incorporated into the SOF.

2. The structured organic film (SOF) composite of claim 1, wherein the polymer additive is present in the SOF in a plurality of nanodomains.

3. The structured organic film (SOF) composite of claim 2, wherein a size of the nanodomains is from about 50 nm to about 1 micron.

4. The structured organic film (SOF) composite of claim 1, wherein the polymer additive further comprises a polyvinyl alcohol.

5. The structured organic film (SOF) composite of claim 1, wherein the polymer additive is present in an amount of from about 5 wt % to about 25 wt % based on a total weight of the SOF composite.

6. The structured organic film (SOF) composite of claim 1, further comprising an ionic segment.

7. The structured organic film (SOF) composite of claim 1, further comprising an ionic capping segment.

8. The structured organic film (SOF) composite of claim 1, wherein a thickness of the SOF is from about 250 nm to about 500 μm.

9. The structured organic film (SOF) composite of claim 1, wherein the structured organic film (SOF) has an ion exchange capacity (IEC) of from about 0.25 mEq/g to about 5.00 mEq/g.

10. The structured organic film (SOF) composite of claim 1, wherein the structured organic film (SOF) has an electrical conductivity of from about 15 mS/cm to about 50 mS/cm.

11. An ion-exchange membrane, comprising the structured organic film (SOF) composite of claim 1.

12. The ion-exchange membrane of claim 11, wherein the structured organic film (SOF) composite is free-standing.

13. A structured organic film (SOF) composite, comprising:

a first domain comprising a first composition; and a second domain comprising a second composition and incorporated into the first domain; and wherein:

the first composition comprises a plurality of segments, and a plurality of linkers, wherein at least one of the plurality of linkers connects at least one of the plurality of segments; and the second composition comprises a polymer additive comprising poly(oxy-1,4-phenylenesulfonyl-1,4-phenylene).

14. The structured organic film (SOF) composite of claim 13, wherein a size of the second domain is from about 50 nm to about 1 micron.

15. The structured organic film (SOF) composite of claim 13, wherein at least one of the plurality of segments comprises:

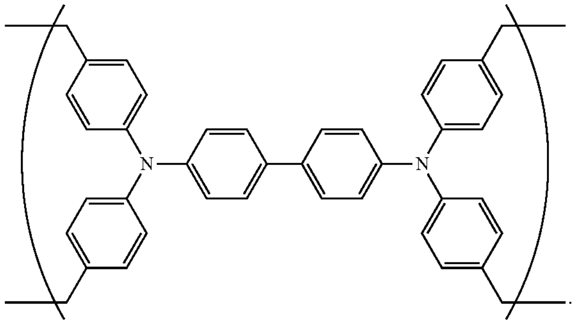

16. The structured organic film (SOF) composite of claim 13, wherein at least one of the plurality of segments comprises a piperidinium-based quaternary ammonium compound, a pyridinium-based quaternary ammonium compound or a combination thereof.

17. The structured organic film (SOF) composite of claim 13, further comprising a plurality of capping segments.

18. The structured organic film (SOF) composite of claim 13, wherein the plurality of capping segments comprises benzyl tris(2-hydroxyethyl) ammonium (BTHEA), N-hydroxyethyl-1,2,4,5-tetramethylimidazolium (NEtTMIm), or a combination thereof.

19. A structured organic film (SOF) composite, comprising:

a plurality of segments; and a plurality of linkers, wherein at least one of the plurality of linkers connects at least one of the plurality of segment; wherein at least one or more of the plurality of segments comprises N,N,N',N'-tetrakis-[(4-hydroxymethyl) phenyl]-biphenyl-4,4'-diamine (THM-TBD); and a polysulfone comprising poly(oxy-1,4-phenylenesulfonyl-1,4-phenylene) incorporated into the SOF.

* * * * *